US011205063B2

(12) United States Patent
Hong et al.

(10) Patent No.: US 11,205,063 B2
(45) Date of Patent: Dec. 21, 2021

(54) SYSTEM AND METHOD OF AUTHENTICATING HANDWRITTEN SIGNATURE BASED ON DYNAMIC MOVEMENT TRACKING OF SPATIAL-DIVISION SEGMENTS

(71) Applicants: SECUVE CO., LTD., Seoul (KR); Paul Hong, Seoul (KR)

(72) Inventors: Ki Yoong Hong, Seoul (KR); Paul Hong, Seoul (KR)

(73) Assignees: SECUVE CO., LTD., Seoul (KR); Paul Hong, Seoul (KR)

( * ) Notice: Subject to any disclaimer, the term of this patent is extended or adjusted under 35 U.S.C. 154(b) by 312 days.

(21) Appl. No.: 15/998,904

(22) PCT Filed: Feb. 15, 2017

(86) PCT No.: PCT/KR2017/001638
§ 371 (c)(1),
(2) Date: Jun. 28, 2019

(87) PCT Pub. No.: WO2017/142299
PCT Pub. Date: Aug. 24, 2017

(65) Prior Publication Data
US 2019/0318148 A1 Oct. 17, 2019

(30) Foreign Application Priority Data
Feb. 16, 2016 (KR) .................. 10-2016-0017746

(51) Int. Cl.
*G06K 9/00* (2006.01)
*G06K 9/62* (2006.01)
*G06F 21/32* (2013.01)

(52) U.S. Cl.
CPC ......... *G06K 9/00174* (2013.01); *G06F 21/32* (2013.01); *G06K 9/00181* (2013.01);
(Continued)

(58) Field of Classification Search
CPC .......... G06F 21/32; G06F 21/31; G06F 21/45; G06F 3/0488; H04L 9/32; G06K 9/00926;
(Continued)

(56) References Cited

U.S. PATENT DOCUMENTS 5,392,363 A * 2/1995 Fujisaki ............. G06K 9/00879
382/187
5,491,758 A * 2/1996 Bellegarda ........... G06K 9/6293
382/187

(Continued)

FOREIGN PATENT DOCUMENTS

JP 2000-353243 A 12/2000
JP 2007-110180 A 4/2007
(Continued)

OTHER PUBLICATIONS

International Search Report of corresponding Patent Application No. PCT/KR2017/001638—4 pages (dated Apr. 25, 2017).
(Continued)

*Primary Examiner* — Claire X Wang
*Assistant Examiner* — Stephen M Brinich
(74) *Attorney, Agent, or Firm* — Studebaker & Brackett PC

(57) ABSTRACT

The present disclosure relates to a handwritten signature authentication system and method. More particularly, the present disclosure provides a system and method of authenticating a handwritten signature based on dynamic movement tracking of spatial-division segments, in which handwritten signature authentication is performed by handwritten signature characteristics information (i.e. overall handwritten signature block characteristics information (Q), overall spatial-division segment block characteristics information (V), overall spatial-division segment block position infor- (Continued)

mation (P) including sub-segment block position information, and overall spatial-division segment block correlation characteristics information (C), spatial-division segment dynamic behavioral characteristics information, overall segment dynamic behavioral characteristics information, segment transition dynamic behavioral characteristics information generated during a segment transition while the handwritten signature is made, and an overall segment transition dynamic behavioral characteristics information) based on spatial-division segment blocks including handwritten signature images (referred to as "segments" or "segment images") divided by a spatial unit.

20 Claims, 14 Drawing Sheets

(52) U.S. Cl.
CPC ..... *G06K 9/00187* (2013.01); *G06K 9/00926* (2013.01); *G06K 9/6261* (2013.01)

(58) Field of Classification Search
CPC ........... G06K 9/00885; G06K 9/00892; G06K 9/00899
See application file for complete search history.

(56) References Cited

U.S. PATENT DOCUMENTS

| | | | | |
|---|---|---|---|---|
| 2004/0203594 | A1* | 10/2004 | Kotzin | G06K 9/00154 455/411 |
| 2009/0279744 | A1* | 11/2009 | Zimmerman | G06T 7/0002 382/112 |
| 2015/0326570 | A1* | 11/2015 | Publicover | G02B 27/017 726/4 |
| 2016/0210453 | A1* | 7/2016 | Seo | G06F 21/36 |

FOREIGN PATENT DOCUMENTS

| | | |
|---|---|---|
| JP | 2007-299226 A | 11/2007 |
| KR | 10-2006-0057343 A | 5/2006 |
| KR | 10-2007-0110335 A | 11/2007 |
| KR | 10-2009-0058145 A | 6/2009 |
| KR | 10-2011-0053783 A | 5/2011 |
| KR | 10-2015-0041569 A | 4/2015 |
| KR | 10-1585842 B1 | 1/2016 |
| WO | 2015-030500 A1 | 3/2015 |

OTHER PUBLICATIONS

International Search Report of corresponding PCT/KR2016/014556—4 pages (dated Mar. 21, 2017).

* cited by examiner

SYSTEM AND METHOD OF AUTHENTICATING HANDWRITTEN SIGNATURE BASED ON DYNAMIC MOVEMENT TRACKING OF SPATIAL-DIVISION SEGMENTS

TECHNICAL FIELD

The present disclosure relates to a handwritten signature authentication system and method and, more particularly, to a system and method of authenticating a handwritten signature based on dynamic movement tracking of spatial-division segments, in which handwritten signature authentication is performed by handwritten signature characteristics information (i.e. overall handwritten signature block characteristics information (Q), overall spatial-division segment block characteristics information (V), overall spatial-division segment block position information (P) including sub-segment block position information, and overall spatial-division segment block correlation characteristics information (C), spatial-division segment dynamic behavioral characteristics information ($\psi_i$), overall segment dynamic behavioral characteristics information ($\Psi$), segment transition dynamic behavioral characteristics information ($\vec{t}_i$) generated during a segment transition while the handwritten signature is made, and an overall segment transition dynamic behavioral characteristics information ($\vec{T}$)) based on spatial-division segment blocks including handwritten signature images (Hereinafter, referred to as "segments" or "segment images") divided by a spatial unit.

BACKGROUND ART

With the development of application-based smart devices such as smartphones and smart pads and the development of mobile communication technologies and Internet communication technologies, people can easily and simply use various services through the Internet and the applications.

Most services require user authentication before the services are provided to the user because a third party may use the services by stealing the user's identity.

While user authentication can be performed with the user's identification card or driver's license in a presence of the user in the offline environment, in the online environment where the service provider does not come into contact with users, different methods of user authentication are needed.

Accordingly, various technologies have been developed and applied to verify the user's identity of the personal information entered for use of the services.

Such technologies may include an Internet Personal Identification Number (I-PIN) authentication, Short Message Service (SMS) authentication, Automatic Response System (ARS) authentication, and electronic signature or digital signature authentication.

According to the SMS authentication, for example, the service server may transmit an authentication code to a mobile terminal (i.e., a mobile phone or a smartphone) of the user through SMS so that the user may input the received authentication code into a web page or an application program, and verify the user by determining whether the authentication code entered by the user matches the authentication code registered for the mobile terminal.

However, the above-described technologies have a risk of being used illegally by a third party when the mobile terminal is lost or personal information is leaked.

Therefore, there is a trend toward hybrid methods that employ two or more of the above technologies to enhance user security, which is increasing demand for additional technologies for more accurate user authentication.

One of such technologies being developed for enhancing the security can be handwritten signature authentication, which is one of biometric information reflecting personal characteristics of each user.

The handwritten signature authentication technology may be divided into two categories: image comparison method that examines match rates of the images of handwritten signatures and a behavioral characteristics data comparison method that compares behavioral characteristics data when a signer handwrites a signature.

Typically, a handwritten signature authentication method employing the image comparison method has a risk that the third party copies the signature image of the user. In this case, the system may determine that the copied signature of the third party matches the actual signature of the user.

Because of such a problem, the behavioral characteristics data comparison method is preferred in a handwritten signature authentication system.

A handwritten signature authentication system employing the behavioral characteristics data comparison method performs handwritten signature authentication by extracting and storing the characteristics of the user's signature patterns, such as pressure, speed, intersection points, and inflection point angles. However, the behavioral characteristics comparison method also often leads to cases where a third party copies the behavioral characteristics to some extent when copying a handwritten signature image. In some cases, the traditional handwritten signature authentication system determines that two signatures match on the basis of similar behavioral characteristics even when the images of the two signatures are completely different.

Therefore, there is a demand for a method for a handwritten signature authentication system that can distinguish handwritten signatures more accurately, thereby enhancing security with higher levels of handwritten signature recognition and authentication precision.

DISCLOSURE OF INVENTION

Technical Problem

The present disclosure provides a system and method of authenticating a handwritten signature based on dynamic movement tracking of spatial-division segments, in which handwritten signature authentication is performed by handwritten signature characteristics information (i.e. overall handwritten signature block characteristics information (Q), overall spatial-division segment block characteristics information (V), overall spatial-division segment block position information (P) including sub-segment block position information, and overall spatial-division segment block correlation characteristics information (C), spatial-division segment dynamic behavioral characteristics information ($\psi_i$), overall segment dynamic behavioral characteristics information ($\Psi$), segment transition dynamic behavioral characteristics information ($\vec{t}_i$) generated during a segment transition while the handwritten signature is made, and an overall segment transition dynamic behavioral characteristics information ($\vec{T}$)) based on spatial-division segment blocks including handwritten signature images (Hereinafter, referred to as "segments" or "segment images") divided by a spatial unit.

Technical Solution

In order to accomplish the above object, the present disclosure provides a system for authenticating a handwritten signature based on dynamic movement tracking of spatial-division segment. The system includes: a handwritten signature input unit that includes a touch input unit configured to output touch data, as handwritten signature input data, including position data and pressure data for positions that are touched by a signer for handwritten signature; an enrollment unit configured to enroll overall handwritten signature block characteristics information ($\Sigma$) of each signer; and a handwritten signature authentication unit configured to store the handwritten signature input data including the touch data received from the handwritten signature input unit, generate a handwritten signature image by identifying the handwritten signature by use of the handwritten signature input data, generate an overall handwritten signature block (S) including the handwritten signature, generate segment blocks by spatially dividing the generated overall handwritten signature block (S) by a predetermined number of divisions, detect a segment image for each of the generated segment blocks, collect the handwritten signature characteristics information ($\Sigma$) including the overall handwritten signature block (S) information, each segment block information, correlation information between the overall handwritten signature block (S) and each segment block, map the collected handwritten signature characteristics information to identification information of the signer, enroll the collected handwritten signature characteristics information in the enrollment unit, collect handwritten signature characteristics information ($\Sigma$) including the overall handwritten signature block (S) information, each segment block information, correlation information between the overall handwritten signature block (S) and each segment block from the touch data entered through the touch input unit of the handwritten signature input unit upon receiving a request for handwritten signature authentication, load the enrolled handwritten signature characteristics information ($\Sigma'$) that corresponds with the identification information of the signer who requests the handwritten signature authentication, and perform the handwritten signature authentication based on segments of the handwritten signature according to a match rate by comparing the enrolled handwritten signature characteristics information ($\Sigma'$) with the collected handwritten signature characteristics information ($\Sigma$).

The handwritten signature authentication unit may include: a handwritten signature characteristics extraction unit configured to store the handwritten signature input data received through the touch input unit of the handwritten signature input unit, generate the handwritten signature image by identifying the handwritten signature by use of the handwritten signature input data, generate the overall handwritten signature block (S) including the handwritten signature, generate the segment blocks by spatially dividing the generated overall handwritten signature block (S) by the predetermined number of divisions, detect the segment image of each of the generated segment blocks, and extract the handwritten signature characteristics information ($\Sigma$) including overall handwritten signature block characteristics information (Q) of the overall handwritten signature block (S), overall segment block characteristics information (V) of the segment blocks constituting the handwritten signature, overall segment block position information (P) of the segment blocks including sub-segment block position information, and overall segment block correlation characteristics information (C) including the correlation information between the overall handwritten signature block (S) and each segment block; a handwritten signature segment block authentication unit configured to perform a handwritten signature authentication according to a predetermined match rate by comparing the handwritten signature characteristics information ($\Sigma$) extracted by the handwritten signature characteristics extraction unit with the pre-enrolled handwritten signature characteristics information ($\Sigma'$); and a control unit configured to save and enroll the handwritten signature characteristics information extracted by the handwritten signature characteristics extraction unit to the enrollment unit upon receiving a request for enrollment, and perform a handwritten signature authentication by controlling the handwritten signature segment block authentication unit upon receiving the request for handwritten signature authentication.

The handwritten signature characteristics extraction unit may include: a handwritten signature start detection unit configured to detect a start of the handwritten signature from the touch data; a handwritten signature end detection unit configured to detect an end of the handwritten signature by designating a final touch data input point as an end point of the handwritten signature when there is no touch data input for a certain period of time after the touch data is entered; a spatial-division segment detection unit configured to generate the handwritten signature image by identifying the handwritten signature by use of the handwritten signature input data received through the touch input unit, generate the overall handwritten signature block (S) including the handwritten signature, generate the segment blocks by spatially dividing the generated overall handwritten signature block (S) by the predetermined number of divisions, and detect the segment image for each of the generated segment blocks; a segment count unit configured to count a number of sub-segments detected by the spatial-division segment detection unit; a spatial-division segment block characteristics detection unit configured to receive the segment image, determine whether the segment image is divided, generate a sub-segment block ($\acute{s}_{i,x}$) including the sub-segment when a sub-segment image re-segmented from the segment image is detected, generate segment block characteristics information ($v_i$) and sub-segment block characteristics information ($\acute{v}_i$) for the segment block ($s_i$) and the sub-segment block ($\acute{s}_{i,x}$), respectively, and generate and output the overall segment block characteristics information (V) including the segment block characteristics information ($v_i$) and the sub-segment block characteristics information ($\acute{v}_i$) along with the overall segment block position information (P); an overall handwritten signature block characteristics detection unit configured to generate and output the overall handwritten signature block characteristics information (Q) of the overall handwritten signature block (S); a sub-segment block correlation detection unit configured to generate and output the overall segment block correlation characteristics information (C) including correlation information between at least two of the overall handwritten signature block (S), the segment block, and the sub-segment blocks; and a handwritten signature characteristics acquisition unit including a handwritten signature characteristics information generation unit configured to generate and output the handwritten signature characteristics information ($\Sigma$) including the overall handwritten signature block characteristics information (Q), the overall segment block characteristics information (V), the overall segment block position information (P), and the overall segment block correlation characteristics information (C).

The overall handwritten signature block characteristics detection unit may further generate and output overall handwritten signature block space information (space(S)) by calculating space area of the overall handwritten signature block (S).

The spatial-division segment block characteristics detection unit may include: a sub-segment block generation unit configured to receive the segment image as input, determine whether the segment image is divided, and generate the sub-segment block ($ś_{i,x}$) including the sub-segment when the sub-segment image re-segmented from the segment image is detected; a segment block position detection unit configured to receive the segment block ($s_i$) and the sub-segment block ($ś_{i,x}$), and detect and output segment block position information (pi) the sub-segment block position information ($ṕ_{i,x}$) which represent edges of the segment block and the sub-segment blocks, respectively; a segment block space characteristics detection unit configured to receive at least one of the segment block ($s_i$), the sub-segment block ($ś_{i,x}$), the segment block position information ($p_i$), and the sub-segment block position information ($ṕ_{i,x}$) and generate and output segment block space information (space($s_i$)) and sub-segment block space information (space($ś_{i,x}$)) by calculating space areas of the segment block ($s_i$) and the sub-segment block ($ś_{i,x}$); a space ratio characteristics detection unit configured to receive the overall handwritten signature block space information (space(S)), the segment block space information (space($s_i$)), and sub-segment block space information (space($ś_{i,x}$)) from the overall handwritten signature block characteristics detection unit, calculate a ratio of a segment block space to an overall handwritten signature block space, a ratio of a sub-segment block space to the overall handwritten signature block space, and a ratio of the sub-segment block space to the segment block space, and generate and output at least one of ratio information ($\Delta_i$) of the segment block space to the overall handwritten signature block space, ratio information ($\acute{\Delta}_{i,x}$) of the sub-segment block space to the overall handwritten signature block space, and ratio information ($\acute{\varepsilon}_{i,x}$) of the sub-segment block space to the segment block space; and a segment block characteristics information generation unit configured to generate the segment block characteristics information ($v_i$) and the sub-segment block characteristics information ($v́_i$) including corresponding information selected from: the segment block position information ($p_i$) of each segment of the handwritten signature, the sub-segment block position information ($ṕ_{i,x}$), the segment block space information (space($s_i$)), the sub-segment block space information (space($ś_{i,x}$)), the ratio information ($\Delta_i$) of the segment block space to the overall handwritten signature block space, the ratio information ($\acute{\Delta}_{i,x}$) of the sub-segment block space to the overall handwritten signature block space, and the ratio information ($\acute{\varepsilon}_{i,x}$) of the sub-segment block space to the segment block space, and generate and output the overall segment block characteristics information (V) for all segment blocks of the handwritten signature.

The block may be a polygon. The sub-segment block generation unit may generate a polygon sub-segment block surrounding the segment by passing through a top, a bottom, a leftmost, and a rightmost points of the sub-segment.

The sub-segment block correlation detection unit may include: an intersection space detection unit configured to detect any adjacent sub-segment block ($ś_{i,y}$) having a relation of inclusion or intersection with the sub-segment block ($ś_{i,x}$), and output, if any, intersection space information ($\acute{\delta}_{i,xy}$) by calculating space of inclusion or intersection area; an intersection space ratio detection unit configured to receive the overall handwritten signature block space information (space(S)), the segment block space information (space($s_i$)), sub-segment block space information (space($ś_{i,x}$)), and sub-segment block intersection space information ($\acute{\delta}_{i,xy}$), generate the ratio information ($\acute{r}_{i,xy}$) of the sub-segment block intersection space to the overall handwritten signature block space by calculating a ratio of the sub-segment block intersection space ($\acute{\delta}_{i,xy}$) to the overall handwritten signature block space (space(S)), generate ratio information ($\acute{\pi}_i(\acute{\delta}_{ij})$) of the sub-segment block intersection space to the sub-segment block space by calculating a ratio of the sub-segment block intersection space ($\acute{\delta}_{i,xy}$) to the sub-segment block space (space($ś_{i,x}$)), and generate ratio information ($\acute{\pi}_j(\acute{\delta}_{ij})$) of the sub-segment block intersection space to an adjacent sub-segment block space by calculating a ratio of the sub-segment block intersection space ($\acute{\delta}_{i,xy}$) to the adjacent sub-segment block space (space($ś_{i,y}$)); a segment block inclusion relation detection unit configured to generate and output sub-segment block inclusion relation information ($\acute{o}_{i,xy}$) which shows whether the adjacent sub-segment block ($ś_{i,y}$) is included in or intersects the sub-segment block ($ś_{i,x}$); a segment positional relation detection unit configured to generate and output sub-segment block positional relation information ($\acute{pos}_{i,xy}$) representing relative position of the adjacent sub-segment block ($ś_{i,y}$) with respect to the sub-segment block ($ś_{i,x}$); an edge positional relation detection unit configured to generate and output sub-segment block edge positional relation information ($\acute{edge}_{i,xy}$) representing relative edge position at which edge of the sub-segment block ($ś_{i,x}$) intersects the adjacent sub-segment block ($ś_{i,y}$); and a correlation characteristics information generation unit configured to generate and output overall segment block correlation characteristics information (C) including the sub-segment block intersection space information ($\acute{\delta}_{i,xy}$), the ratio information ($\acute{r}_{i,xy}$) of the sub-segment block intersection space to the overall handwritten signature block space the ratio information ($\acute{\pi}_i(\acute{\delta}_{ij})$) of the sub-segment block intersection space to the sub-segment block space, the ratio information ($\acute{\pi}_j(\acute{\delta}_{ij})$) of the sub-segment block intersection space to the adjacent sub-segment block space, the sub-segment block inclusion relation information ($\acute{o}_{i,xy}$), the sub-segment block positional relation information ($\acute{pos}_{i,xy}$), and the sub-segment block edge positional relation information ($\acute{edge}_{i,xy}$).

The handwritten signature characteristics extraction unit may include a dynamic movement tracking unit configured to generate overall segment dynamic behavioral characteristics information ($\Psi$) by calculating segment dynamic behavioral characteristics information ($\psi_i$) representing dynamic behavioral characteristics occurred through dynamic movement of the handwritten signature based on received dynamic movement point information ($\alpha_i$) in the spatially-divided segment block and generate overall segment transition dynamic behavioral characteristics information ($\vec{T}$) by calculating segment transition dynamic behavioral characteristics information ($\vec{t}_i$). The spatial-division segment detection unit may generate the dynamic movement point information ($\alpha_i$), whenever the touch data is input, for a position at which the touch data occurs and output the dynamic movement point information ($\alpha_i$) to the dynamic movement tracking unit. The handwritten signature characteristics acquisition unit may generate and output the handwritten signature characteristics information ($\Sigma$) that further includes the overall segment dynamic behavioral characistics information (Ψ) and the overall segment transition dynamic behavioral characteristics information ($\vec{T}$) in addition to the overall handwritten signature block characteristics information (Q), the overall segment block characteristics information (V), the overall segment block position information (P), and the overall segment block correlation characteristics information (C).

The dynamic movement point information ($\alpha_i$) may be composed according to a following equation a:

$$\cdot\alpha_i = (*prev, id, x, y, ts, sid, gid, *next) \quad \text{[Equation a]}$$

The segment dynamic behavioral characteristics information ($\psi_i$) representing dynamic behavioral characteristics may be composed according to a following Equation a, and the overall segment dynamic behavioral characteristics information (Ψ) may be composed according to a following Equation b:

$$\psi_i = \begin{cases} \{s_i, \#_i, \\ \text{Left\_DOT}_{i,}Lcnt^i, \text{Right\_DOT}_i, Rcnt^i, \\ \text{Top\_DOT}_{i,}Tcnt^i, \text{Bottom\_DOT}_i, Bcnt^i, \\ \text{In\_DOT}_{i,}Icnt^i, \text{Seg\_DOT}_i, total^i, \\ LINK_{i,}LINKcnt_i, oset_i\} \end{cases} \quad \text{[Equation a]}$$

$$\Psi = \{\psi_i \mid i = 0, 1, 2, \ldots, (n-1)\} = \quad \text{[Equation b]}$$
$$\{S, AP, \text{All\_Seg\_DOT}, \text{All\_LINK}, OSET\}$$

A segment transition dynamic behavioral characteristics information ($\vec{t}_i$) between the spatial-division segments may be composed according to a following Equation a, and an overall segment transition dynamic behavioral characteristics information ($\vec{T}$) may be composed according to a following Equation b:

$$\vec{t}_i = (s_j, s_k, \text{outgoing}, \text{incoming}) \quad \text{[Equation a]}$$

where (i=0, 1, 2, . . . , tmax),
(outgoing∈Seg_DOT$_j$⊆#$_j$)
(incoming∈Seg_DOT$_k$⊆#$_k$)

$$\vec{T} = \{\vec{t}_i \mid i=0,1,2,\ldots,(n-1)\} \quad \text{[Equation b]}$$

In order to accomplish the above objects, the present disclosure provides a method of authenticating a handwritten signature based on dynamic movement tracking of spatial-division segment. The method includes: an enrollment process of storing handwritten signature input data including touch data received from a handwritten signature input unit, generating a handwritten signature image by identifying the handwritten signature by use of the handwritten signature input data, generating an overall handwritten signature block (S) including the handwritten signature, generating segment blocks by spatially dividing the generated overall handwritten signature block (S) by a predetermined number of divisions, detecting a segment image for each of the generated segment blocks, collecting handwritten signature characteristics information (Σ) including the overall handwritten signature block (S) information, each segment block information, correlation information between the overall handwritten signature block (S) and each segment block, mapping the collected handwritten signature characteristics information to identification information of the signer, and enrolling the collected handwritten signature characteristics information in an enrollment unit; and a handwritten signature authentication process of collecting handwritten signature characteristics information (Σ) including the overall handwritten signature block (S) information, each segment block information, correlation information between the overall handwritten signature block (S) and each segment block from the touch data entered through a touch input unit of a handwritten signature input unit upon a request for handwritten signature authentication, loading enrolled handwritten signature characteristics information (Σ') that corresponds with the identification information of the signer who requests the handwritten signature authentication, and performing the handwritten signature authentication based on segments of the handwritten signature according to a match rate by comparing the enrolled handwritten signature characteristics information (Σ') with the collected handwritten signature characteristics information (Σ).

The enrollment process may include: an enrollment request monitoring operation that monitors whether a request for handwritten signature enrollment is made; a signer identification information acquisition operation that acquires the signer identification information to be enrolled upon request for handwritten signature enrollment; a handwritten signature characteristics information acquisition operation that acquires the handwritten signature characteristics information (Σ) from touch data entered through the touch input unit regarding to the handwritten signature of the signer; and a handwritten signature enrollment operation that maps the handwritten signature characteristics information to the identification information of the signer and enrolls the handwritten signature characteristics information in the enrollment unit.

The handwritten signature authentication process may include: a handwritten signature authentication request monitoring operation that monitors whether the request for handwritten signature authentication is made; a signer identification information acquisition operation that acquires the signer identification information upon receiving the request for handwritten signature authentication; a handwritten signature characteristics information acquiring operation that acquires the handwritten signature characteristics information (Σ) from the touch data received through the touch input unit for the handwritten signature of the signer; an enrolled handwritten signature characteristics information loading operation that loads the pre-enrolled handwritten signature characteristics information (Σ') corresponding with the acquired signer identification information; and a handwritten signature authentication operation that performs handwritten signature authentication by comparing the acquired handwritten signature characteristics information (Σ) with the enrolled handwritten signature characteristics information (Σ') as loaded and outputs a result of the authentication.

The handwritten signature characteristics information (Σ) acquisition operation may include: a handwritten signature tracking operation that begins tracking of the handwritten signature from the touch data of the handwritten signature input data entered through the handwritten signature input unit; a segment detection operation that generates the handwritten signature image by identifying the handwritten signature by use of the handwritten signature input data received through the touch input unit, generates the overall handwritten signature block (S) including the handwritten signature, generates the segment blocks by spatially dividing the overall handwritten signature block (S) by the predetermined number of divisions, and detects and outputs the segment image for each of the segment blocks; a segment count operation that counts a number of the sub-segments detected in the spatial-division segment detection operation;

a segment block characteristics detecting operation that receives the segment image, determines whether the segment image is divided, generates a sub-segment block ($\acute{s}_{i,x}$) including the sub-segment when a sub-segment image re-segmented from the segment image is detected, generates segment block characteristics information ($v_i$) and sub-segment block characteristics information ($\acute{v}_i$) for the segment block ($s_i$) and the sub-segment block ($\acute{s}_{i,x}$), respectively, and generate and output overall segment block characteristics information (V) including the segment block characteristics information ($v_i$) and the sub-segment block characteristics information ($\acute{v}_i$); an overall handwritten signature block characteristics detection operation that generates and outputs overall handwritten signature block characteristics information (Q) of the overall handwritten signature block (S); a segment block correlation detection operation that generates and outputs the overall segment block correlation characteristics information (C) including correlation information between at least two of the overall handwritten signature block (S), the segment block, and the sub-segment blocks; and a handwritten signature characteristics information generation operation that generates the overall segment block characteristics information (V) including the segment block characteristics information ($v_i$) and the sub-segment block characteristics information ($\acute{v}_i$) for all the segments and sub-segments, respectively, and generates and outputs the handwritten signature characteristics information ($\Sigma$) including the overall handwritten signature block characteristics information (Q), the overall segment block characteristics information (V), overall segment block position information (P) of the generated segment blocks including sub-segment block position information, overall segment block correlation characteristics information (C), and overall segment dynamic behavioral characteristics information ($\Psi$).

The overall handwritten signature block characteristics detection operation may further generate and output overall handwritten signature block space information (space(S)) by calculating space area of the overall handwritten signature block (S). The segment block characteristics detection operation may include: a sub-segment block generation operation that receives the segment image as input, determines whether the segment image is divided, and generates and outputs the sub-segment block ($\acute{s}_{i,x}$) including the sub-segment when the sub-segment image re-segmented from the segment image is detected; a segment block position detection operation that receives the segment block ($s_i$) and the sub-segment block ($\acute{s}_{i,x}$), and detects and outputs segment block position information ($p_i$) the sub-segment block position information ($\acute{p}_{i,x}$) which represent edges of the segment block and the sub-segment blocks, respectively; a segment block space characteristics detection operation that receives at least one of the segment block ($s_i$), the sub-segment block ($\acute{s}_{i,x}$), the segment block position information ($p_i$), and the sub-segment block position information ($\acute{p}_{i,x}$) and generates and outputs segment block space information (space($s_i$)) and sub-segment block space information (space($\acute{s}_{i,x}$)) by calculating space areas of the segment block ($s_i$) and the sub-segment block ($\acute{s}_{i,x}$); a space ratio characteristics detection operation that receives the overall handwritten signature block space information (space(S)), the segment block space information (space($s_i$)), and sub-segment block space information (space($\acute{s}_{i,x}$)), calculates a ratio of a segment block space to an overall handwritten signature block space, a ratio of a sub-segment block space to the overall handwritten signature block space, and a ratio of the sub-segment block space to the segment block space, and generates and outputs at least one of ratio information ($\Delta_i$) of the segment block space to the overall handwritten signature block space, ratio information ($\acute{\Delta}_{i,x}$) of the sub-segment block space to the overall handwritten signature block space, and ratio information ($\acute{\varepsilon}_{i,x}$) of the sub-segment block space to the segment block space; and a segment block characteristics information generation operation that generates the segment block characteristics information ($v_i$) and the sub-segment block characteristics information ($\acute{v}_i$) including corresponding information selected from: the segment block position information ($p_i$) of each segment of the handwritten signature, the sub-segment block position information ($\acute{p}_{i,x}$), the segment block space information (space($s_i$)), the sub-segment block space information (space($\acute{s}_{i,x}$)), the ratio information ($\Delta_1$) of the segment block space to the overall handwritten signature block space, the ratio information ($\acute{\Delta}_{i,x}$) of the sub-segment block space to the overall handwritten signature block space, and the ratio information ($\acute{\varepsilon}_{i,x}$) of the sub-segment block space to the segment block space, and generates and outputs the overall segment block characteristics information (V) for all segment blocks of the handwritten signature.

The segment block correlation detection operation may include: an intersection space detection operation that detects any adjacent sub-segment block ($\acute{s}_{i,y}$) having a relation of inclusion or intersection with the sub-segment block ($\acute{s}_{i,x}$), and outputs, if any, intersection space information ($\acute{\delta}_{i,xy}$) by calculating space of inclusion or intersection area; an intersection space ratio detection operation that receives the overall handwritten signature block space information (space(S)), the segment block space information (space($s_i$)), sub-segment block space information (space($\acute{s}_{i,x}$)), and sub-segment block intersection space information ($\acute{\delta}_{i,xy}$), generates the ratio information ($\acute{r}_{i,xy}$) of the sub-segment block intersection space to the overall handwritten signature block space by calculating a ratio of the sub-segment block intersection space ($\acute{\delta}_{i,xy}$) to the overall handwritten signature block space (space(S)), generates ratio information ($\pi_i(\acute{\delta}_{ij})$) of the sub-segment block intersection space to the sub-segment block space by calculating a ratio of the sub-segment block intersection space ($\acute{\delta}_{i,xy}$) to the sub-segment block space (space($\acute{s}_{i,x}$)), and generates ratio information ($\acute{\pi}_i(\acute{\delta}_{ij})$) of the sub-segment block intersection space to an adjacent sub-segment block space by calculating a ratio of the sub-segment block intersection space ($\acute{\delta}_{i,xy}$) to the adjacent sub-segment block space (space($\acute{s}_{i,y}$)); a segment block inclusion relation detection operation that generates and outputs sub-segment block inclusion relation information ($\acute{o}_{i,xy}$) which shows whether the adjacent sub-segment block ($\acute{s}_{i,y}$) is included in or intersects the sub-segment block ($\acute{s}_{i,x}$); a segment positional relation detection operation that generates and outputs sub-segment block positional relation information ($\acute{pos}_{i,xy}$) representing relative position of the adjacent sub-segment block ($\acute{s}_{i,y}$) with respect to the sub-segment block ($\acute{s}_{i,x}$); an edge positional relation detection operation that generates and outputs sub-segment block edge positional relation information ($\acute{edge}_{i,xy}$) representing relative edge position at which edge of the sub-segment block ($\acute{s}_{i,x}$) intersects the adjacent sub-segment block ($\acute{s}_{i,y}$); and a correlation characteristics information generation operation that generates and outputs overall segment block correlation characteristics information (C) including the sub-segment block intersection space information ($\acute{\delta}_{i,xy}$), the ratio information ($\acute{r}_{i,xy}$) of the sub-segment block intersection space to the overall handwritten signature block space the ratio information ($\pi_i(\acute{\delta}_{ij})$) of the sub-segment block intersection space to the sub-segment block space, the ratio information ($\vec{\pi}_j(\delta_{ij})$) of the sub-segment block intersection space to the adjacent sub-segment block space, the sub-segment block inclusion relation information ($ó_{i\_xy}$), the sub-segment block positional relation information ($pós_{i\_xy}$), and the sub-segment block edge positional relation information ($édge_{i\_xy}$).

The handwritten signature characteristics information acquisition operation may include: a dynamic movement tracking operation that generates overall segment dynamic behavioral characteristics information ($\Psi$) by calculating segment dynamic behavioral characteristics information ($\psi_i$) representing dynamic behavioral characteristics occurred through dynamic movement of the handwritten signature based on received dynamic movement point information ($\alpha_i$) in the spatially-divided segment block and generates overall segment transition dynamic behavioral characteristics information ($\vec{T}$) by calculating segment transition dynamic behavioral characteristics information ($\vec{t}_i$). In the spatial-division segment detection operation, dynamic movement point information ($\alpha_i$) may be generated whenever the touch data is input for a position at which the touch data occurs and is output for the dynamic movement tracking operation. In the handwritten signature characteristics generation operation, the handwritten signature characteristics information ($\Sigma$) further including the overall segment dynamic behavioral characteristics information ($\Psi$) and the overall segment transition dynamic behavioral characteristics information ($\vec{T}$) in addition to the overall handwritten signature block characteristics information (Q), the overall segment block characteristics information (V), the overall segment block position information (P), and the overall segment block correlation characteristics information (C) may be generated and output.

The dynamic movement point information ($\alpha_i$) may be composed according to a following equation a:

$$\alpha_i = (*\text{prev}, id, x, y, ts, sid, gid, *\text{next}) \quad \text{[Equation a]}$$

The segment dynamic behavioral characteristics information ($\psi_1$) representing dynamic behavioral characteristics may be composed according to a following Equation a, and the overall segment dynamic behavioral characteristics information ($\Psi$) may be composed according to Equation b:

$$\{s_i, \#_i, \text{Left\_DOT}_i, \text{Lcnt}^i, \text{Right\_DOT}_i, \text{Rcnt}^i, \\ \psi_i = \text{Top\_DOT}_i, \text{Tcnt}^i, \text{Bottom\_DOT}_i, \text{Bcnt}^i, \text{In\_} \\ \text{DOT}_i, \text{Icnt}^i, \text{Seg\_DOT}_i, \text{total}^i, \text{LINK}_i, \\ \text{LINKcnt}_i, oset_i\} \quad \text{[Equation a]}$$

$$\Psi = \{\psi_i | i=0,1,2,\ldots,(n-1)\} = \{S, AP, \text{All\_Seg\_DOT}, \\ \text{All\_LINK}, OSET\} \quad \text{[Equation b]}$$

A segment transition dynamic behavioral characteristics information ($\vec{t}i$) between the spatial-division segments may be composed according to Equation a, and an overall segment transition dynamic behavioral characteristics information ($\vec{T}$) may be composed according to Equation b:

$$\vec{t}_1 = (s_j, s_k, \text{outgoing}, \text{incoming}) \quad \text{[Equation a]}$$

where (i=0, 1, 2, ..., tmax),
(outgoing∈Seg_DOT$_j$⊆#$_j$)
(incoming∈Seg_DOT$_k$⊆#$_k$)

$$\vec{T} = \{\vec{t}_i | i=0,1,2,\ldots,(n-1)\} \quad \text{[Equation b]}$$

Advantageous Effects

According to the present disclosure, a handwritten signature of a signer is divided into segments by a certain spatial unit, and the handwritten signature authentication is performed by using characteristics information of segment blocks containing the divided spatial-division segments, characteristics information of overall handwritten signature block, and correlation information between the segment blocks. Therefore, the present disclosure may perform the handwritten signature authentication based specifically on the segment blocks and improve a recognition rate of the handwritten signature.

BEST MODE

The configuration and operation of a handwritten signature authentication system based on dynamic movement tracking of spatial-division segment blocks according to an embodiment of the present disclosure will be described first with reference to attached drawings, and then a handwritten signature authentication method based on dynamic movement tracking of spatial-division segment blocks in the system will be described.

Figure 3:
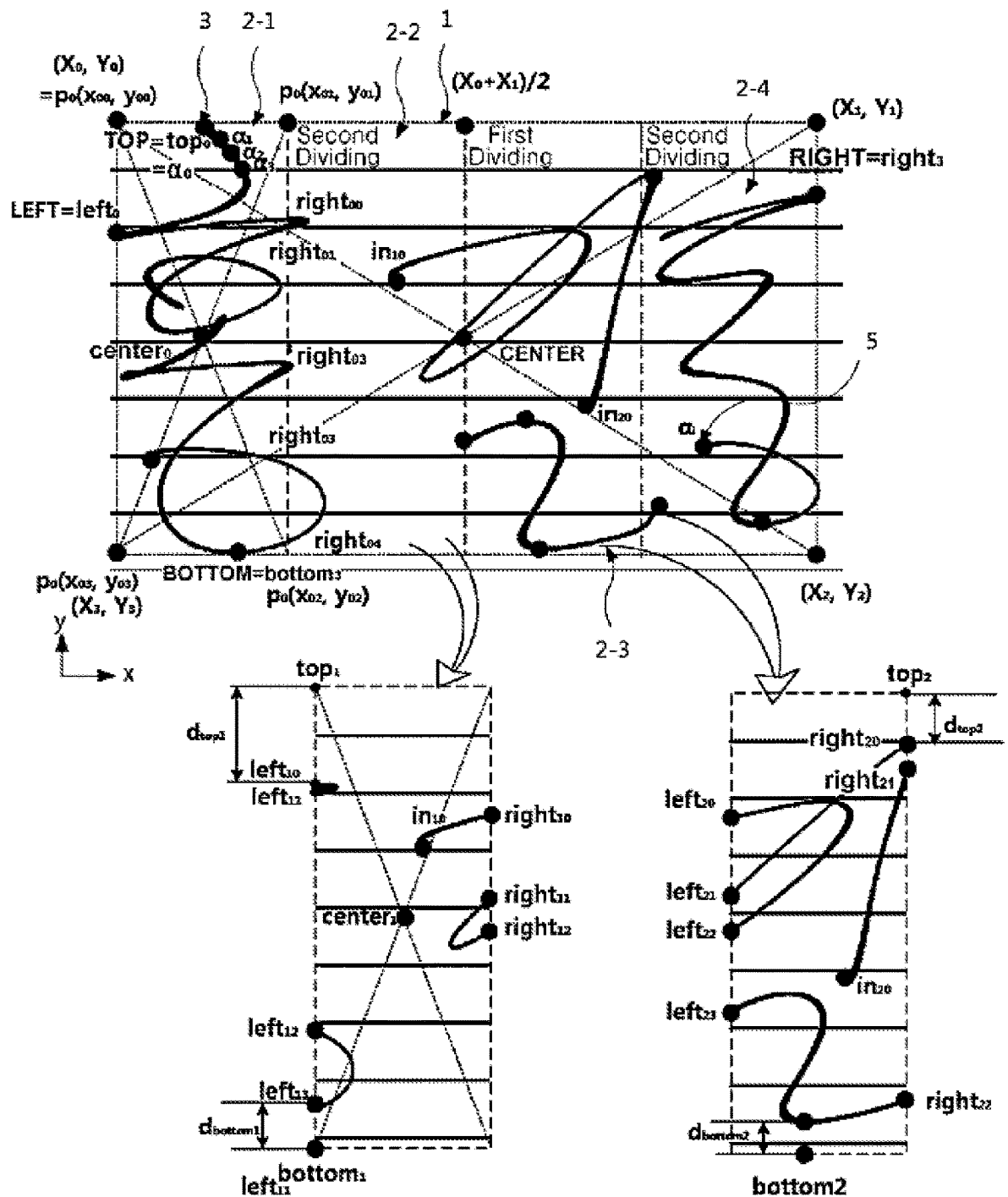
FIG. 3 illustrates a method of generating segment blocks of a handwritten signature along with characteristics information elements of the segment blocks according to a first embodiment of the present disclosure.
Figure 4:
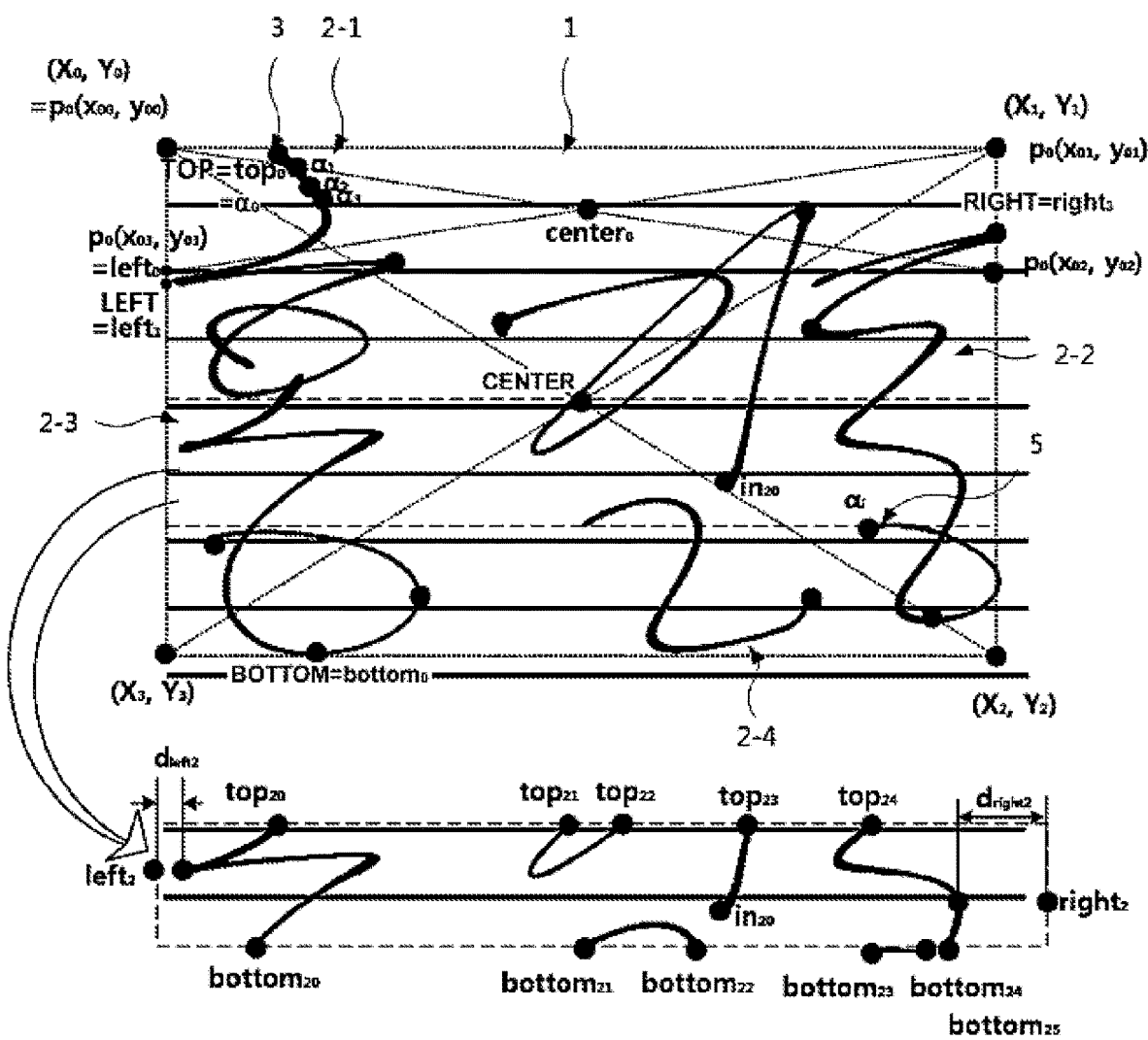
FIG. 4 illustrates a method of generating segment blocks of a handwritten signature along with characteristics information elements of the segment blocks according to a second embodiment of the present disclosure.
Figure 5:
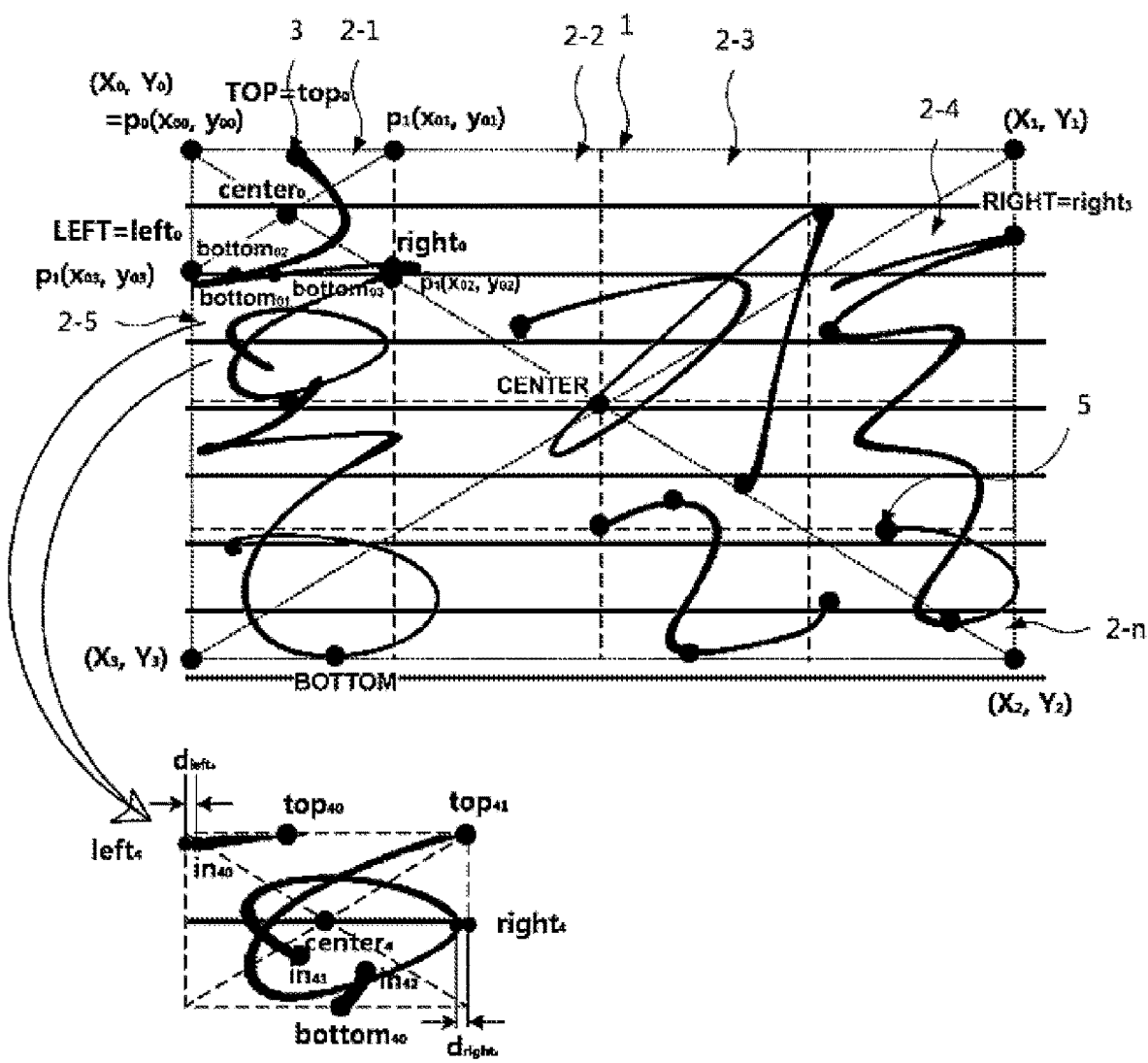
FIG. 5 illustrates a method of generating segment blocks of a handwritten signature along with characteristics information elements of the segment blocks according to a third embodiment of the present disclosure.

In the present disclosure, handwritten signature spatial-division segments (hereinafter, referred to as "spatial-division segments," "handwritten signature segments," "segments," or "segment images" as necessary) refer to parts of a handwritten signature generated by dividing the handwritten signature signed by a signer by a certain spatial unit. Therefore, for a same signature, the number of the handwritten signature segments may differ depending on the signer. For example, the number of the handwritten signature segments (n) for a signature may be one, two, three, or four depending on the signer, even if the signer tries to write the same signature. Similarly, the correlations between the segments will be different as the positions and lengths of the segments will also be different depending on the signer even if the signer tries to write the same signature. According to an embodiment of the present disclosure, the spatial-division segments can be obtained by vertically and/or horizontally dividing an overall handwritten signature block, into segments of equal sizes, by a horizontal space dividing level (Hm) and/or a vertical space dividing level (Vn) which is set previously according to a desired handwritten signature authentication precision. Therefore, the higher the authentication precision is, the larger the horizontal space dividing level (Hm) and/or the vertical space dividing level (Vn) is. For example, FIG. 3 shows a case in which the vertical space dividing level (Vn) is two and the overall handwritten signature block is divided into $2^2$ segment blocks, FIG. 4 shows a case where the horizontal space dividing level (Hm) is two and the overall handwritten signature block is divided into $2^2$ segment blocks, and FIG. 5 shows a case where both the vertical space dividing level (Vn) and the horizontal space dividing level (Hm) are two and the overall handwritten signature block is divided into $2^2+2$ segment blocks.

Figure 1:
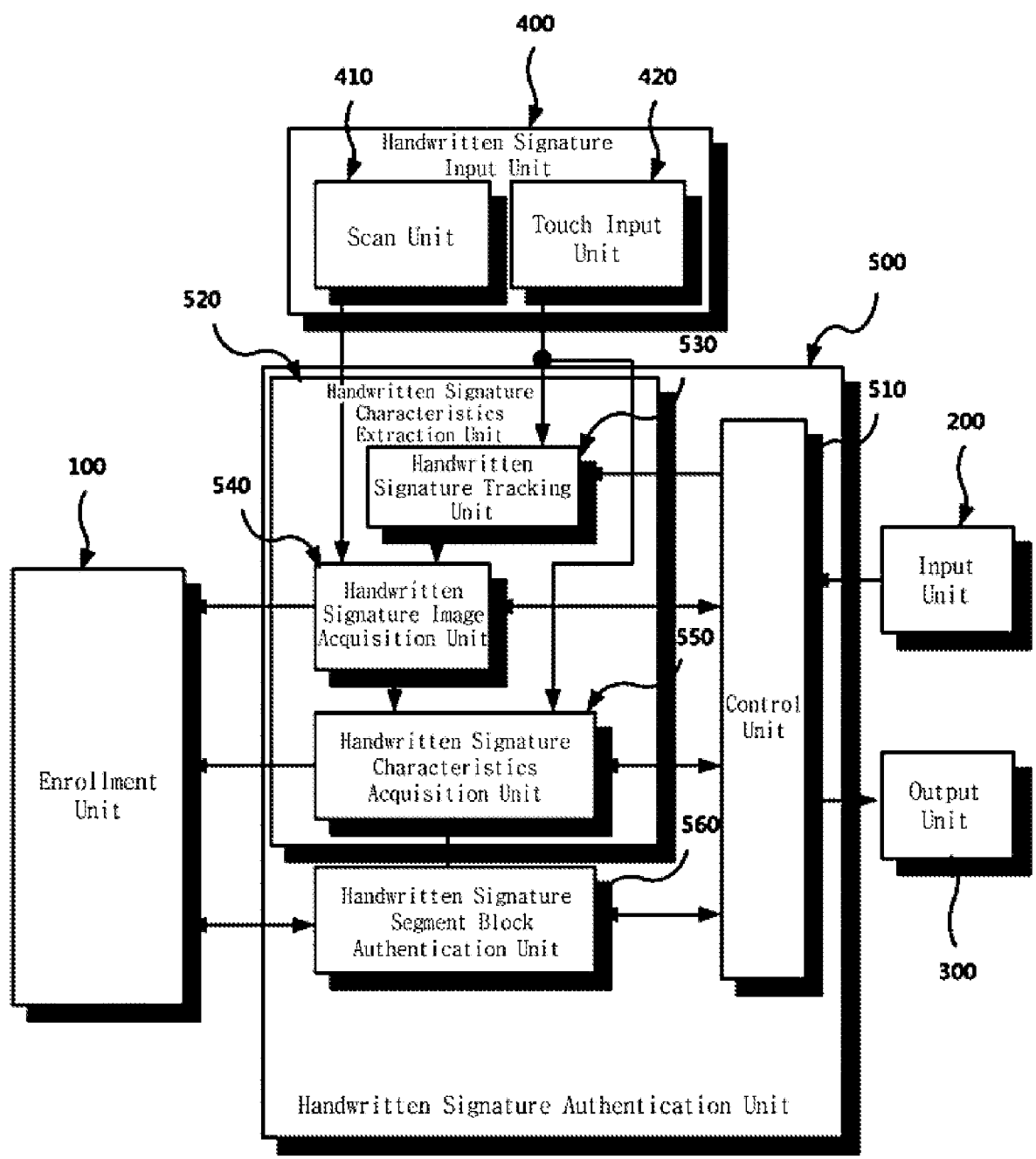
FIG. 1 is a block diagram of a handwritten signature authentication system based on dynamic movement tracking of spatial-division segment blocks according to an embodiment of the present disclosure.

FIG. 1 is a block diagram of a handwritten signature authentication system based on dynamic movement tracking of spatial-division segment blocks according to an embodiment of the present disclosure.

Referring to FIG. 1. the handwritten signature authentication system based on dynamic movement tracking of spatial-division segment blocks according to an embodiment of the present disclosure may include an enrollment unit 100, a handwritten signature input unit 400, and a handwritten signature authentication unit 500, and may further include an input unit 200 and an output unit 300.

The enrollment unit 100 may be set up in a variety of storage media including a hard drive of a personal computer (PC) or a laptop computer, a portable hard drive such as a universal serial bus (USB) device, a security token, a subscriber identification module (SIM) card embedded in a mobile device such as a cell phone or a smartphone, a micro SD card in the mobile device, a TrustZone in the mobile device, and an online hard drive. The enrollment unit 100 stores handwritten signature characteristics information (Z).

The handwritten signature characteristics information (Z) includes overall handwritten signature block characteristics information (Q), overall segment block characteristics information (V), and overall segment block correlation characteristics information (C). Detailed information included in these types of information will be described more fully with reference to FIGS. 2 to 6 below.

The input unit 200 may be a key input device that has numerous keys generating multiple commands and outputs key data (key signals) on pressed keys, a touchpad that also functions as a screen and outputs position data on touch points, and a receiver that receives data from an external device through wired and wireless communications. The input unit 200 sends commands such as a handwritten signature enrollment command and a handwritten signature authentication command upon request of a user to the handwritten signature authentication unit 500. If the handwritten signature authentication unit 500 is configured in the form of a server, the input unit 200 may also be a point-of-sale (POS) terminal, payment terminal, or mobile communication terminal from a remote place.

The output unit 300 allows the handwritten signature authentication unit 500 to output a handwritten signature image, the handwritten signature characteristics information, and handwritten signature verification result. In case that the handwritten signature authentication unit 500 is configured in a mobile communication terminal, the output unit 300 may be a display device such as a liquid crystal display (LCD). In case that the handwritten signature authentication unit 500 is configured to be a server, the output unit 300 may be a message transmission server that transmits a mobile communication message containing a handwritten signature verification result such as a short message service (SMS) message, a long message service (LMS) message, a multimedia message service (MMS) message, an application server that transmits a push message, an e-mail server, or a mobile communication terminal that receives and displays the verification result.

The handwritten signature input unit 400 may be configured in a terminal unit that receives a handwritten signature, such as a PC, mobile communication terminal, POS terminal, or payment terminal owned by a user or a service provider. Also, the handwritten signature input unit 400 may be a separate device capable of being connected to a separate device and output handwritten signature input data to acquire an image of the handwritten signature written by the user and may include at least one of a scan unit 410 and a touch input unit 420. It is recommended, however, to ensure that it includes a touch input unit 420 as it should receive input of a signature in a handwritten form. The touch input unit 420 may be a touchpad, touch screen, or smart pen, which enables to track a handwritten signature and collect image characteristics information of handwritten signature and segments, and behavioral characteristics information.

The scan unit 410 scans a paper on which a signature is handwritten and sends scanned data to the handwritten signature authentication unit 500.

The touch input unit 420 may be a touchpad or a touch screen and sends touch data that includes continuous position data and pressure data on a signature handwritten by a user to the handwritten signature authentication unit 500 as input data.

The handwritten signature authentication unit 500 includes a control unit 510, a handwritten signature characteristics extraction unit 520, and a handwritten signature segment block authentication unit 560.

The handwritten signature authentication unit 500 may be configured based on an application in a mobile communication terminal or a computer, based on an application or a web server in a server, or in the form of firmware in a POS or payment terminal. The configuration of an application server, web server, and firmware based on an application, firmware, or web server according to the present invention will not be further described in detail as it is obvious to those skilled in the art.

To describe the configuration and operation of the handwritten signature authentication unit 500 in more detail, the control unit 510 controls overall operation of the handwritten signature authentication unit 500. In particular, the control unit 510 determines whether the command received from the input unit 200 is for handwritten signature enrollment or authentication, controls the operation of enrollment or authentication depending on the command, and sends the control results to the output unit 300.

The handwritten signature characteristics extraction unit 520 extracts and outputs the handwritten signature characteristics information (Z) based on the spatial-division segment block from the handwritten signature input data entered through the touch input unit 420 of the handwritten signature input unit 400.

In detail, the handwritten signature characteristics extraction unit 520 includes a handwritten signature tracking unit 530, a handwritten signature image acquisition unit 540, and a handwritten signature characteristics acquisition unit 550.

The handwritten signature tracking unit 530 detects continuous position data from the touch data from the touch input unit 420 of the handwritten signature input unit 400 and sends it to the handwritten signature image acquisition unit 540.

The handwritten signature image acquisition unit 540 receives the scan data from the handwritten signature input unit 400 or the position data from the handwritten signature tracking unit 530, and acquires and outputs a handwritten signature image from the scan data or the position data.

The handwritten signature image acquisition unit 540 may acquire a tracked handwritten signature image from the scan unit 410 or may generate the tracked handwritten signature image by tracking the position data entered in real time through the touch input unit 420 and the handwritten signature tracking unit 530.

After the handwritten signature image is acquired through the handwritten signature image acquisition unit 540 and the overall handwritten signature block including the handwritten signature image is generated, the handwritten signature characteristics acquisition unit 550 divides the overall handwritten signature block into a predetermined number of a certain spatial units to generate the handwritten signature segments and generates handwritten signature segment images for the handwritten signature segments.

In addition, the handwritten signature characteristics acquisition unit 550 generates blocks (hereinafter, referred to as "segment blocks") of a polygon (hereinafter, assumed to be a rectangle) for each of the generated handwritten signature segment images, extracts overall segment block characteristics information (V) on the generated segment blocks, generates an overall handwritten signature block (S) for an entire handwritten signature image entered through the handwritten signature image acquisition unit 540 or acquired by the handwritten signature image acquisition unit 540 itself, generates overall handwritten signature block characteristics information (Q) on the overall handwritten signature block, generates overall segment block position information (P) including block position information of each of the generated segment blocks (i.e. including sub-segment block position information), generates overall segment block correlation characteristics information (C) based on correlations between the segment blocks, generates segment dynamic behavioral characteristics information ($\psi_i$) of each spatial-division segment ($s_i$) and overall segment dynamic behavioral characteristics information (Ψ), generates segment transition dynamic behavioral characteristics information ($\vec{t}_i$) between the spatial-division segments and overall segment transition dynamic behavioral characteristics information ($\vec{T}$), and generates and outputs the handwritten signature characteristics information (Σ) that includes the overall handwritten signature block characteristics information (Q), the overall segment block characteristics information (V), the overall segment block position information (P) including the sub-segment block position information, the overall segment block correlation characteristics information (C), the overall segment dynamic behavioral characteristics information (Ψ), and the overall segment transition dynamic behavioral characteristics information ($\vec{T}$), as shown in Equation 1 below. Depending on implementations, the handwritten signature characteristics information (Σ) may include only the overall handwritten signature block characteristics information (Q), the overall segment block characteristics information (V), the overall segment block position information (P) including the sub-segment block position information, and the overall segment block correlation characteristics information (C), or may further include the overall segment dynamic behavioral characteristics information (Ψ) and the overall segment transition dynamic behavioral characteristics information ($\vec{T}$) as shown in Equation 1 below.

$$\Sigma = \{Q, P, V, C, \Psi, \vec{T}\} \qquad \text{[Equation 1]}$$

The detailed configuration of the handwritten signature characteristics acquisition unit 550 will be described below with reference to FIGS. 2, 7, and 8.

Upon receiving the handwritten signature authentication command from the control unit 510, the handwritten signature segment block authentication unit 560 receives signer's identification information from the handwritten signature input unit 400 and the handwritten signature characteristics information (Σ) from the handwritten signature characteristics extraction unit 520, loads pre-enrolled handwritten signature characteristics information (Σ') corresponding to the signer identification information from the enrollment unit 100, compares the loaded pre-enrolled handwritten signature characteristics information (Σ') with the handwritten signature characteristics information (Σ) entered from the handwritten signature characteristics extraction unit 520 to determine whether they match beyond a predetermined matching level.

To be more specific, the handwritten signature segment block authentication unit 560 compares the enrolled overall block characteristics information (Q') of the loaded enrolled handwritten signature characteristics information (Σ') with the overall handwritten signature block characteristics information (Q) of the handwritten signature characteristics information (Σ) extracted through the handwritten signature characteristics extraction unit 520, compares the enrolled overall segment block characteristics information (V') with the extracted overall segment characteristics information (V), compares the enrolled overall segment block position information (P') including the sub-segment block position information with the extracted overall segment block position information (P) including the sub-segment block position information, compares the enrolled overall segment block correlation characteristics information (C') with the extracted overall segment block correlation characteristics information (C), compares the enrolled overall segment dynamic behavioral characteristics information ($\Psi_i'$) with the extracted overall segment dynamic behavioral characteristics information ($\Psi_i$), and compares the enrolled overall segment transition dynamic behavioral characteristics information ($\vec{T}_i'$) with the extracted overall segment transition dynamic behavioral characteristics information ($\vec{T}_i$) to perform the handwritten signature authentication by determining whether the match rates of the above comparisons respectively reach predetermined matching levels.

Figure 2:
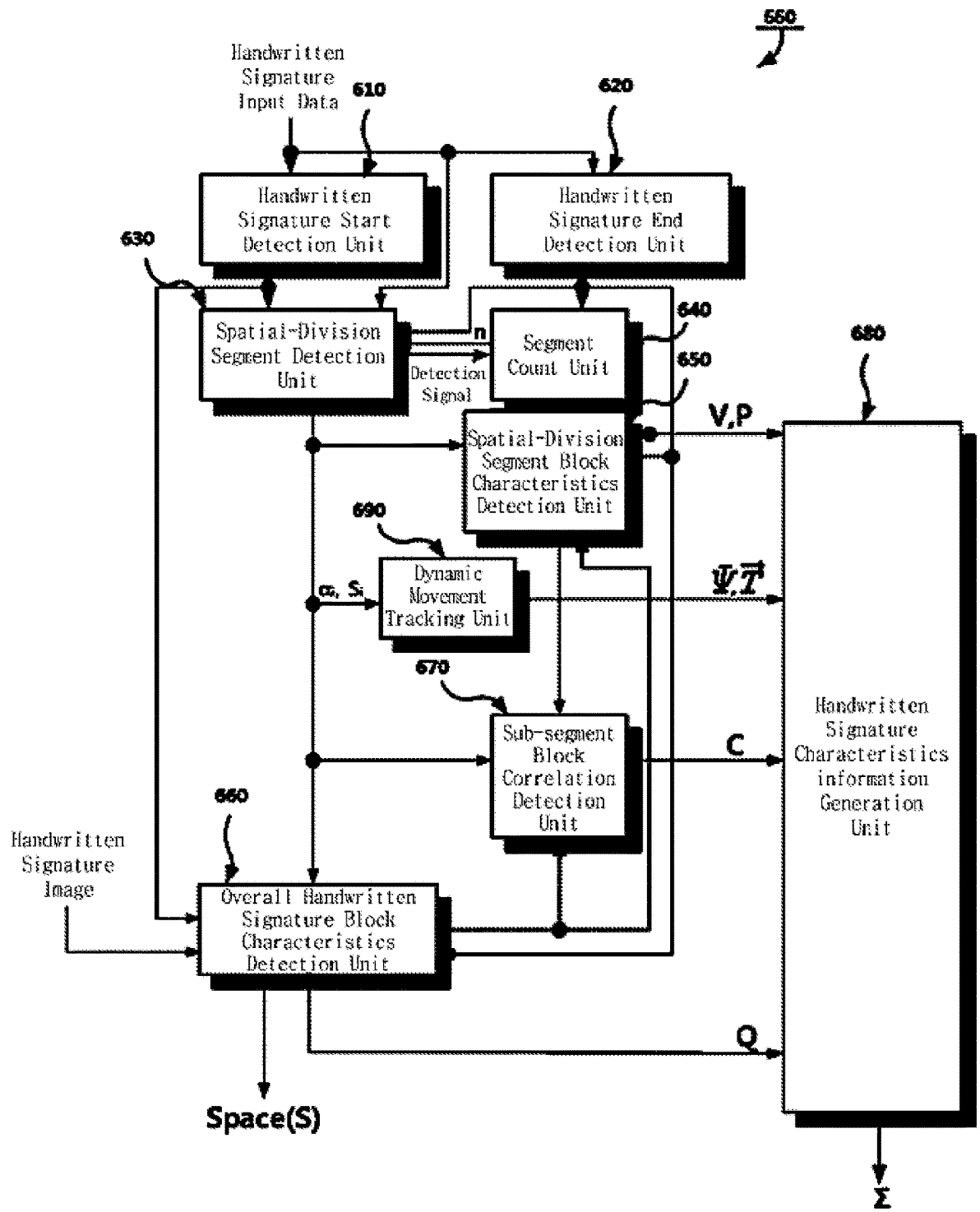
FIG. 2 is a block diagram of a handwritten signature characteristics acquisition unit in the handwritten signature authentication system based on dynamic movement tracking of spatial-division segment blocks according to an embodiment of the present disclosure.
Figure 6:
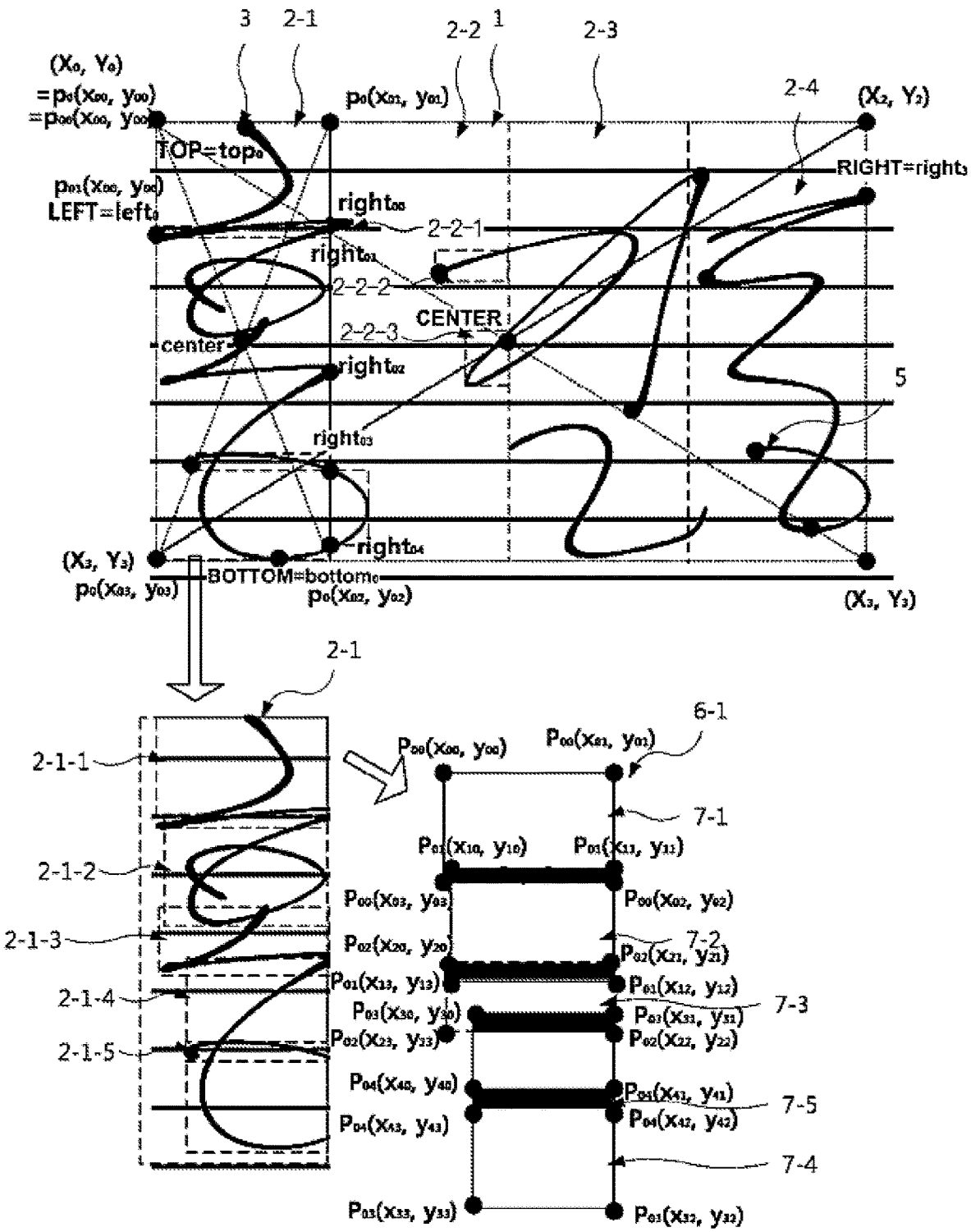
FIG. 6 illustrates a method of generating sub-segment blocks of the handwritten signature and detecting patterns of the sub-segment blocks according to a first embodiment of the present disclosure, and characteristics information elements of the sub-segment blocks.

FIG. 2 is a block diagram of the handwritten signature characteristics acquisition unit in the handwritten signature authentication system based on dynamic movement tracking of spatial-division segment blocks according to an embodiment of the present disclosure, FIG. 3 illustrates a method of generating the segment blocks of the handwritten signature along with characteristics information elements of the segment blocks according to a first embodiment of the present disclosure, FIG. 4 illustrates a method of generating the segment blocks of the handwritten signature along with characteristics information elements of the segment blocks according to a second embodiment of the present disclosure, FIG. 5 illustrates a method of generating the segment blocks of the handwritten signature along with characteristics information elements of the segment blocks according to a third embodiment of the present disclosure, and FIG. 6 illustrates a method of generating the sub-segment blocks of the handwritten signature and detecting patterns of the sub-segment blocks according to a first embodiment of the present disclosure, and characteristics information elements of the sub-segment blocks. The configuration and operation of the handwritten signature characteristics acquisition unit 550 will be described in detail with reference to FIGS. 2 to 6.

The handwritten signature characteristics acquisition unit 550 includes a handwritten signature start detection unit 610, a handwritten signature end detection unit 620, a spatial-division segment detection unit 630, a segment count unit 640, a spatial-division segment block characteristics detection unit 650, an overall handwritten signature block characteristics detection unit 660, a sub-segment block correlation detection unit 670, and a handwritten signature characteristics information generation unit 680. Depending on embodiments, the handwritten signature characteristics acquisition unit 550 may further include a dynamic movement tracking unit 690.

The handwritten signature start detection unit 610 receives continuous handwritten signature input data from the touch input unit 400 while the signer handwrites a signature on the touch input unit 420 of the handwritten signature input unit 400 as shown in FIG. 3.

When the handwritten signature input data starts to be input, the handwritten signature start detection unit 610 detects a start point (3) of the handwritten signature as shown in FIG. 3. The start point (3) may be a start point of a first handwritten signature segment.

The handwritten signature start detection unit 610 outputs handwritten signature start point information and first segment start point information, and sends a handwritten signature start point detection signal to the spatial-division segment detection unit 630.

If the handwritten signature input data is not entered through the touch input unit 420 for a certain period of time, the handwritten signature end detection unit 620 detects and determines the end point of the handwritten signature corresponding to the final touch data input point, namely Point (5) in FIG. 3, as the end point of the handwritten signature, and outputs the determined end point information of the handwritten signature.

After receiving the handwritten signature start point detection signal from the handwritten signature start detection unit 610 and the handwritten signature end point detection signal from the handwritten signature end detection unit 620, the spatial-division segment detection unit 630 generates the entire handwritten signature image and the overall handwritten signature block.

When overall handwritten signature block is generated, the spatial-division segment detection unit 630 vertically divides the overall handwritten signature block by a preset dividing level (m) to obtain $2^m$ segment blocks of equal sizes as shown in FIG. 3, horizontally divides the overall handwritten signature block by a preset dividing level (m) to obtain $2^m$ segment blocks of equal sizes as shown in FIG. 4, or divides the overall handwritten signature block vertically by a preset dividing level (l) and then horizontally by a preset dividing level (m) to obtain $2^l \times 2^m = 2^{l+m}$ segment blocks of equal sizes as shown in FIG. 5. In other words, the spatial-division segment detection unit 630 divides the overall handwritten signature block by a certain space unit to generate the segment blocks of the same sizes.

While generating the segment blocks, the spatial-division segment detection unit 630 detects a top position ($top_i$), a bottom position ($bottom_i$), a leftmost position ($left_i$), and a rightmost position ($right_i$) of each segment block at which the segment block meets the segment image as shown in FIGS. 3-6, and stores position information of the detected points as segment block characteristics information. Since the segment block 2 is divided spatially according to the present disclosure, there may be a plurality of top positions ($top_i$), bottom positions ($bottom_i$), leftmost positions ($left_i$), or rightmost positions ($right_i$) or there may be no such point at each side of the segment block as shown in FIGS. 3-6. Here, if there are a plurality of such points at a side of the segment block, the information on the number of the points may be used as characteristics information of the segment block.

Meanwhile, in case that there is no such point on a side, the spatial-division segment detection unit 630 may determine a position corresponding to a segment image position closest to the side at which the point does not exist as a virtual point, and use information of a distance between a position in the segment image and the virtual position of the side of the segment block 2 as the characteristics information of the segment block.

In FIG. 3, for example, a second segment block (2-2) has four leftmost positions ($left_1$) and three rightmost positions ($right_1$). At this time, the number of leftmost positions, i.e. four, and the number of leftmost positions, i.e. three, may be used as the characteristics information of the second segment block.

Also, though the second segment block (2-2) has no bottom position ($bottom_1$), the position of a leftmost position ($left_{13}$) corresponding to a segment image position closest to the lower side of the segment block (2-2) may be set as the bottom position ($bottom_1$), and stored together with information of a distance ($d_{bottom1}$) from the lower side to the point. As described above, the distance information may be used as the characteristics information of the second segment block (2-2).

Also, the spatial-division segment detection unit 630 counts a number (n) of the segment blocks.

Also, for each of the generated segment blocks, the spatial-division segment detection unit 630 loads touch data of the segment block and tracks the touch data to detect and output a handwritten signature image in the segment block (hereinafter referred to 'segment image').

The spatial-division segment detection unit 630 outputs a sub-segment detection signal to the segment count unit 640 whenever a new segment is detected.

Referring to FIGS. 3-6, for example, the spatial-division segment detection unit 630 detects the entire handwritten signature image after the signer initiates the handwritten signature and completes the handwritten signature, and generates the overall handwritten signature block (1) containing the generated entire handwritten signature image.

When the overall handwritten signature block (1) is generated, the spatial-division segment detection unit 630 finds a midpoint in the direction of x-axis, divides the overall handwritten signature block (1) into two blocks based on a center line passing through the midpoint in the direction of the x-axis (referred to as "first dividing"), and further divides each of the divided blocks into two blocks based on a midpoint in the direction of the x-axis of the divided block (referred to as "second dividing"). Accordingly, depending on the dividing level (m), $2^m$ segment blocks are generated.

The spatial-division segment detection unit 630 outputs start point information of the start point (3) and end point information of the end point (5) of each of the detected segments.

In the example shown in FIG. 3 where the dividing level (m) is two, the spatial-division segment detection unit 630 detects four handwritten signature segments and outputs a detection signal whenever a sub-segment is detected from the detected handwritten signature segments.

Also, the spatial-division segment detection unit 630 detects sub-segment images in the segment blocks and outputs the sub-segment images to the spatial-division segment block characteristics detection unit 650.

The segment count unit 640 counts the number (m) of the sub-segments each time the sub-segment detection signal is received from the spatial-division segment detection unit 630 and outputs the count number (m) information. Since the segment block (2-1) shown in FIGS. 3 and 6 includes five sub-segment images, the segment count unit 640 outputs five as the counted number (m) information of the sub-segments.

When a segment block and segment image are received from the spatial-division segment detection unit 630, the spatial-division segment block characteristics detection unit 650 generates segment block characteristics information ($v_i$) and sub-segment block characteristics information ($\acute{v}_i$). The spatial-division segment block characteristics detection unit 650 generates and outputs the overall segment block characteristics information (V) after the segment block characteristics information ($v_i$) and the sub-segment block characteristics information ($\acute{v}_i$) are acquired for all the segments of the handwritten signature. The detailed configuration and operation of the spatial-division segment block characteristics detection unit 650 will be described below with reference to FIG. 4.

The segment blocks may have a form of a various shapes of polygon, such as a rectangle and a pentagon, however, it is recommended that the segment blocks are rectangular-shaped as shown in FIGS. 3-6, so that the same rule may be applicable in generating and describing all the segments of the handwritten signature.

The rectangular segment block (2) according to the present disclosure is divided into spatial units of the same sizes.

The spatial-division segment block characteristics detection unit 650 detects the top position ($top_i$), the bottom position ($bottom_i$), the leftmost position ($left_i$), and the rightmost position ($right_i$) of the segment image formed in each of the generated segment blocks (2).

The overall handwritten signature block characteristics detection unit 660 generates and outputs the overall handwritten signature block characteristics information (Q) from the overall handwritten signature block (S) including all the handwritten signature images acquired from the handwritten signature image acquisition unit 540 or the spatial-division segment detection unit 630. The overall handwritten signature block characteristics information (Q) includes position data of four corners [{($X_0,Y_0$),($X_1,Y_1$),($X_2,Y_2$), ($X_3,Y_3$)}] of the overall handwritten signature block (S) and overall handwritten signature block space information (space(S)) as shown in Equation 2.

$$Q=\{(X_0,Y_0),(X_1,Y_1),(X_2,Y_2),(X_3,Y_3)\}\cup\{space(S)\} \qquad [\text{Equation 2}]$$

The sub-segment block correlation detection unit 670 receives the segment block characteristics information ($v_i$) and the sub-segment block characteristics information ($\acute{v}_i$) from the spatial-division segment block characteristics detection unit 650 and receives the overall handwritten signature block space information (space(S)) of the overall handwritten signature block (1) from the overall handwritten signature block characteristics detection unit 660. The sub-segment block correlation detection unit 670 generates and outputs overall segment block correlation characteristics information (C), for each segment block ($s_i$), including correlation information between each sub-segment block ($\acute{s}_{i,x}$) and one or more of its adjacent segment sub-blocks ($s_{i,y}$) and correlation information between the segment block and the overall handwritten signature segment block.

The handwritten signature characteristics information generation unit 680 receives the overall segment block characteristics information (V) from the spatial-division segment block characteristics detection unit 650, receives the overall handwritten signature block characteristics information (Q) from the overall handwritten signature block characteristics detection unit 660, receives the overall segment block correlation characteristics information (C) from the sub-segment block correlation detection unit 670, and generates and outputs the handwritten signature characteristics information ($\Sigma$) including the overall segment block characteristics information (V), the overall handwritten signature block characteristics information (Q), and the overall segment block correlation characteristics information (C).

In case that the dynamic movement tracking unit 690 is equipped in the handwritten signature characteristics acquisition unit 550, the spatial-division segment detection unit 630 generates and outputs dynamic movement point information ($\alpha_i$) every time the touch data is input when the handwritten signature start point detection signal is input from the handwriting signature start detection unit 610.

In such a case, the dynamic movement tracking unit 690 calculates the segment dynamic behavioral characteristics information ($\psi_i$) from the dynamic movement point information ($\alpha_i$) and the spatial-division segment block information ($s_i$) and generates the overall segment dynamic behavioral characteristics information ($\Psi$) and the overall segment transition dynamic behavioral characteristics information ($\vec{T}$) to output to the handwritten signature characteristics information generation unit 680. The detection of the dynamic movement point information ($\alpha_i$) in the spatial-division segment detection unit 630 and the generation of the dynamic behavioral characteristics information ($\psi_i$), the overall segment dynamic behavioral characteristics information ($\Psi$), the segment transition dynamic behavioral characteristics information ($\vec{t}_i$), and the overall segment transition dynamic behavioral characteristics information ($\vec{T}$) in the dynamic movement tracking unit 690 will be described below in detail.

Figure 7:
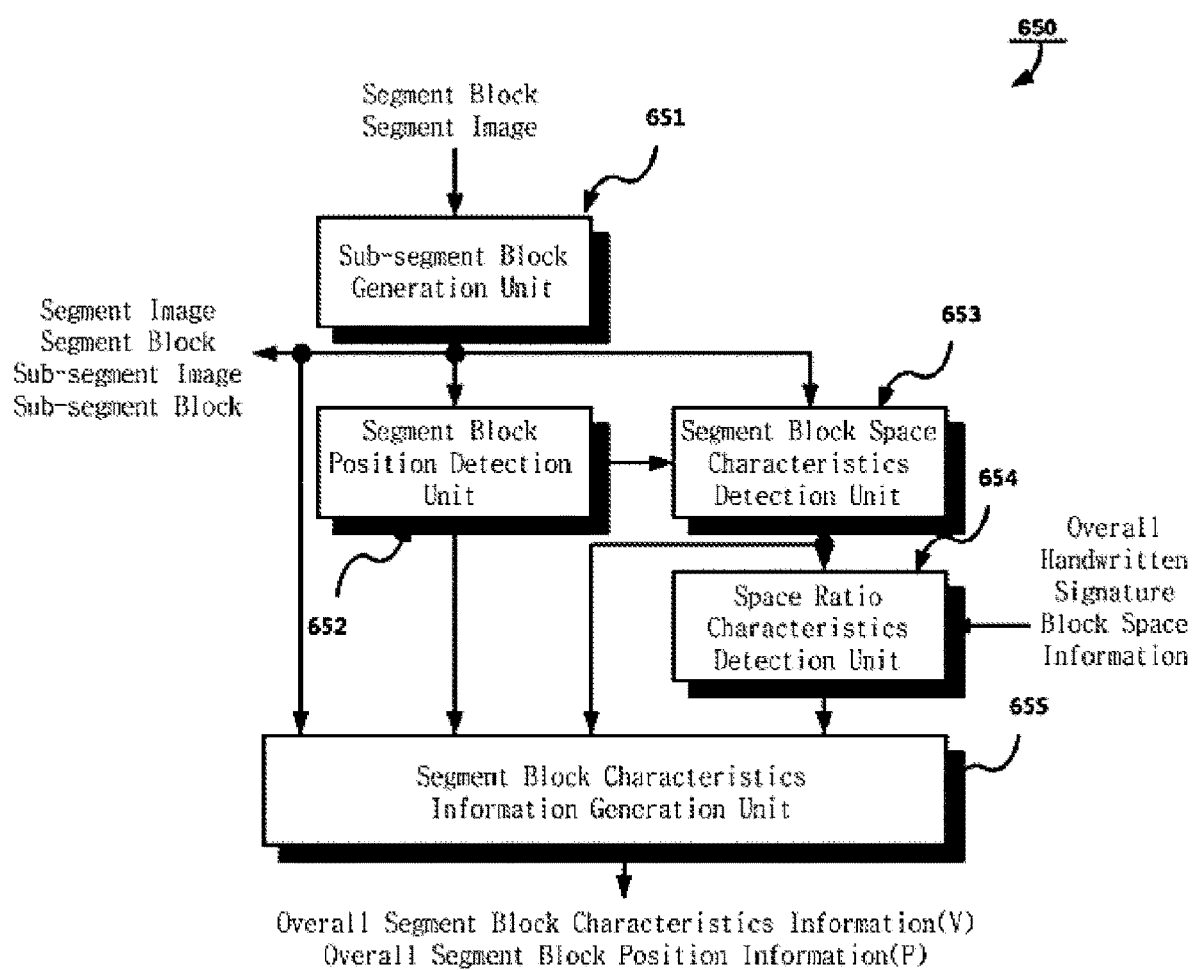
FIG. 7 is a block diagram of a spatial-division segment block characteristics detection unit in the handwritten signature characteristics acquisition unit according to an embodiment of the present disclosure.

FIG. 7 is a block diagram of the spatial-division segment block characteristics detection unit in the handwritten signature characteristics acquisition unit 550 according to an embodiment of the present disclosure.

The spatial-division segment block characteristics detection unit 650 includes a sub-segment block generation unit 651, a segment block position detection unit 652, a segment block space characteristics detection unit 653, a space ratio characteristics detection unit 654, and a segment block characteristics information generation unit 655.

The sub-segment block generation unit 651 receives the segment block ($s_i$) and the segment image, detects an image that may be disjointed from the segment image or is cut by the segment blocks (hereinafter, referred to as "sub-segment image"), and generates the sub-segment block ($\acute{s}_{i,x}$) including the sub-segment image to output the segment image, the segment block ($s_i$), the sub-segment image, and the sub-segment block ($\acute{s}_{i,x}$) to the segment block position detection unit 652, the segment block space characteristics detection unit 653, and the segment block characteristics information generation unit 655.

In case that the segment block ($s_i$) contains two or more sub-segment images that may be disjointed from each other like a first segment block (2-1) of FIG. 6, the sub-segment block generation unit 651 generates a sub-segment block (2-1-1), sub-segment block (2-1-2), sub-segment block (2-1-3), sub-segment block (2-1-4), and sub-segment block (2-1-5).

Upon receiving the segment block ($s_i$) and the sub-segment block ($\acute{s}_{i,x}$) from the sub-segment block generation unit 651, the segment block position detection unit 652 detects and outputs segment block position information ($p_i$) and sub-segment block position information ($\acute{p}_{i,x}$) for each of the edges of the segment block ($s_i$) and the sub-segment block ($\acute{s}_{i,x}$), respectively. In case of a rectangular segment block, the segment block position information ($p_i$) may be expressed by Equation 3.

$$p_i = \{p_{i0}(x_{i0}, y_{i0}), p_{i1}(x_{i1}, y_{i1}), p_{i2}(x_{i2}, y_{i2}), p_{i3}(x_{i3}, y_{i3})\} \quad \text{[Equation 3]}$$

Also, the segment block position detection unit 652 may further output the sub-segment block ($\acute{s}_{i,x}$) as shown in FIG. 6, where 'i' denotes an index for the segment block, 'x' denotes an index for the sub-segment block, and therefore '$\acute{s}_{i,x}$' denotes an x-th sub-segment of an i-th segment. Also, the segment block position detection unit 652 may further output the sub-segment block position information (Pi.) for the sub-segment block ($\acute{s}_{i,x}$).

In case that the block is rectangular-shaped, the sub-segment block position information ($\acute{p}_{i,x}$) may be expressed by Equation 4.

$$\acute{p}_{i,x} = \{\acute{p}_{i,x0}(x_{i,x0}, y_{i,x0}), \acute{p}_{i,x1}(x_{i,x1}, y_{i,x1}), \acute{p}_{i,x2}(x_{i,x2}, y_{i,x2}), \acute{p}_{i,x3}(x_{i,x3}, y_{i,x3})\} \quad \text{[Equation 4]}$$

Thus, in case that the block is rectangular-shaped, the overall sub-segment block position information ($\acute{p}_i$) for the sub-segment block ($\acute{s}_{i,x}$) may be expressed by Equation 5.

$$\acute{p}_i = \{\acute{p}_{i,x} | m = 0, 1, 2, \ldots, (n-1)\} \quad \text{[Equation 5]}$$

('m' denotes number of sub-segment blocks)

Therefore, overall segment block position information (P) for the entire handwritten signature, that is, for the entire segments may be expressed by Equation 6.

$$P = \{p_i\} \cup \{\acute{p}_i\} \text{ where } i = 0, 1, 2, \ldots, (n-1) \quad \text{[Equation 6]}$$

('n' denotes number of segment blocks)

In case where the segment block includes five sub-segment blocks as in the case of the first segment block (2-1) shown in FIG. 6, the segment block position detection unit 652 may further generate pattern information of a pattern (6-1) based on the sub-segment block position information ($\acute{p}_{i,x}$). The pattern information may be stored in the form of the sub-segment block position information ($\acute{p}_{i,x}$) or in the form of image data corresponding to the pattern.

The segment block space characteristics detection unit 653 calculates space areas of the segment blocks ($s_i$) received from the sub-segment block generation unit 651 and outputs segment block space information (space($s_i$)).

Also, the segment block space characteristics detection unit 653 may further calculate space areas of the sub-segment blocks ($\acute{s}_{i,x}$) ('x' denotes an index corresponding to the number of the sub-segment blocks) received from the sub-segment block generation unit 651 and generate sub-segment block space information (space($\acute{s}_{i,x}$)). The segment block space characteristics detection unit 653 may output the sub-segment block space information (space($\acute{s}_{i,x}$)) along with the segment block space information (space($s_i$)) or separately from the segment block space information (space($s_i$)).

The space ratio characteristics detection unit 654 receives the segment block space information (space($s_i$)) and the sub-segment block space information (space($\acute{s}_{i,x}$)) from the segment block space characteristics detection unit 653, receives the overall handwritten signature block space information (space(S)) from the overall handwritten signature block characteristics detection unit 660, and calculates and outputs information of a ratio ($\Delta_i$) of the segment block space to the overall handwritten signature block space, information of a ratio ($\acute{\Delta}_{i,x}$) of the sub-segment block space to the overall handwritten signature block space, and information of a ratio ($\varepsilon_{i,x}$) of the sub-segment block space to the segment block space.

In other words, in case that there exist a plurality of sub-segment blocks ($\acute{s}_{i,x}$) in one segment block ($s_0$)(2-1), where i=0, x=0, 1, 2, 3, 4, as shown in FIGS. 3 and 6, the space ratio characteristics detection unit 654 may calculate and output the information of the ratio ($\acute{\Delta}_{i,x}$) of the sub-segment block space to the overall handwritten signature block space, and the information of the ratio ($\varepsilon_{i,x}$) of the sub-segment block space to the segment block space.

The segment block characteristics information generation unit 655 receives the segment block position information ($p_i$) and the sub-segment block position information ($\acute{p}_{i,x}$) from the segment block position detection unit 652, receives the segment block space information (space($s_i$)) and the sub-segment block space information (space($\acute{s}_{i,x}$)) from the segment block space characteristics detection unit 653, and receives the information of the ratio ($\Delta_i$) of the segment block space to the overall handwritten signature block space, the information of the ratio ($\acute{\Delta}_{i,x}$) of the sub-segment block space to the overall handwritten signature block space, and the information of the ratio ($\acute{\varepsilon}_{i,x}$) of the sub-segment block space to the segment block space to generate the segment block characteristics information ($v_i$). After the segment block characteristics information ($v_i$) is generated for all the segment blocks, the segment block characteristics information generation unit 655 generates and outputs the overall segment block characteristics information (V).

The segment block characteristics information ($v_i$) may be expressed by Equation 7.

$$v_i = \{p_i, \text{space}(s_i), \Delta_i\} \quad \text{[Equation 7]}$$

In case that there exist a plurality of sub-segment blocks ($\acute{s}_{i,x}$) in one segment block ($s_0$)(2-1) as shown in FIGS. 3 and 6, the segment block characteristics information generation unit 655 may further include the information of the ratio ($\acute{\Delta}_{i,x}$) of the sub-segment block space to the overall handwritten signature block space and the information of the ratio ($\acute{\varepsilon}_{i,x}$) of the sub-segment block space to the segment block space in the overall segment block characteristics information (V).

Here, sub-segment block characteristics information ($\acute{v}_{i,x}$) for each of the sub-segment blocks and a set of the sub-segment block characteristics information ($\acute{v}_i$) may be expressed by Equation 8.

$$\acute{v}_{i,x} = \{\acute{p}_{i,x}, \text{space}(\acute{s}_{i,x}), \acute{\Delta}_{i,x}, \acute{\varepsilon}_{i,x}\}$$

$$\acute{v}_i = \{\acute{v}_{i,x} | x=0,1,2,\ldots,(m-1)\} \quad \text{[Equation 8]}$$

('m' denotes number of sub-segment blocks)

Also, the overall segment block characteristics information (V) may be expressed by Equation 9.

$$V = \{v_i\} \cup \{\acute{v}_i\} \text{ where } i=0,1,2,\ldots,(n-1) \quad \text{[Equation 9]}$$

('n' denotes number of segment blocks)

Figure 8:
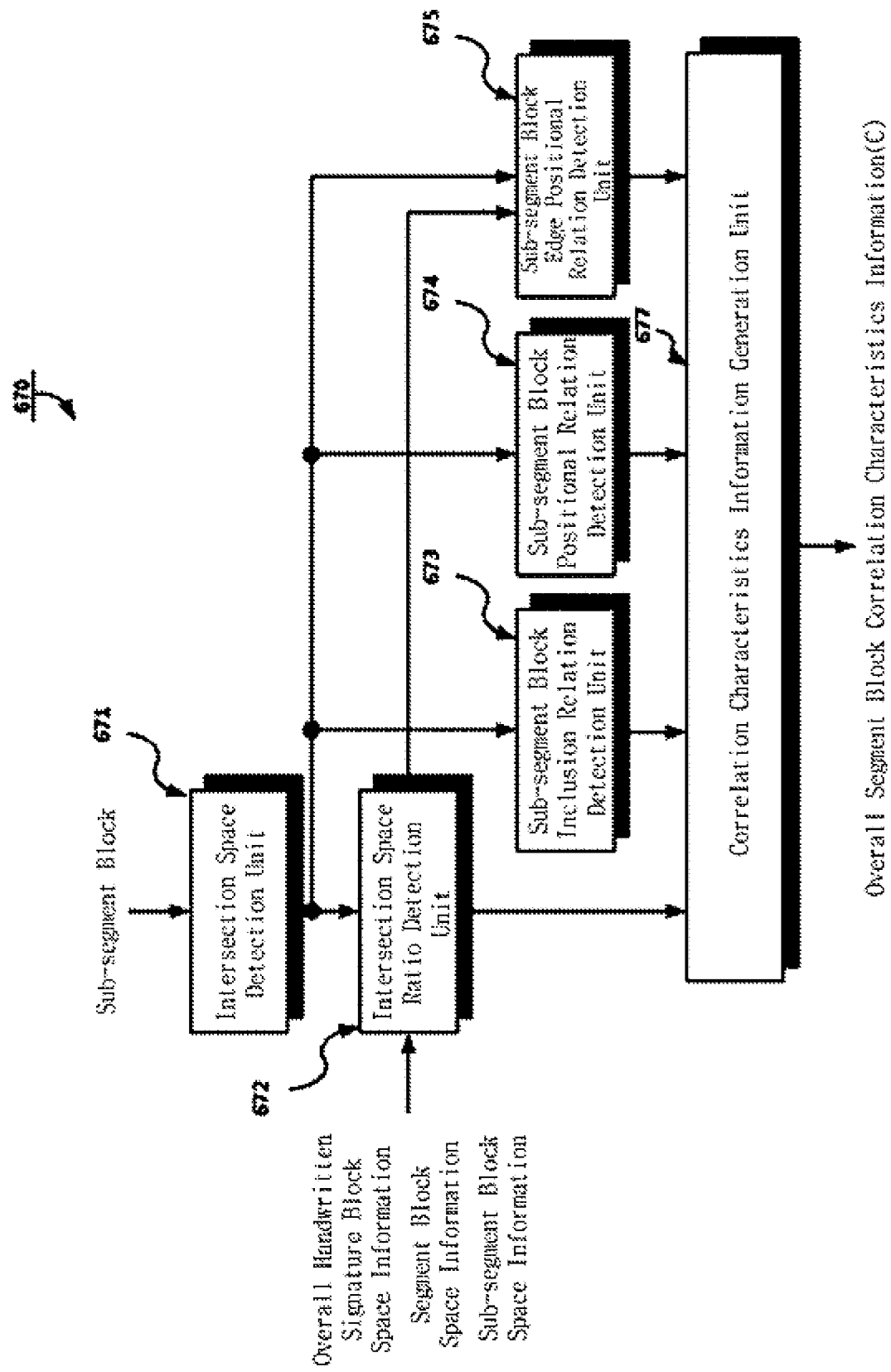
FIG. 8 is a block diagram of a sub-segment block correlation detection unit in the handwritten signature characteristics acquisition unit according to an embodiment of the present disclosure.
Figure 9A:
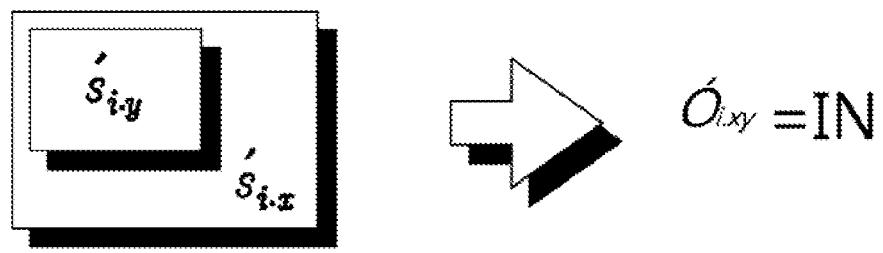
FIGS. 9A-9C illustrate a method of generating an inclusion relation of sub-segment blocks which is one of correlation information between the segment blocks according to an embodiment of the present disclosure.
Figure 9B:
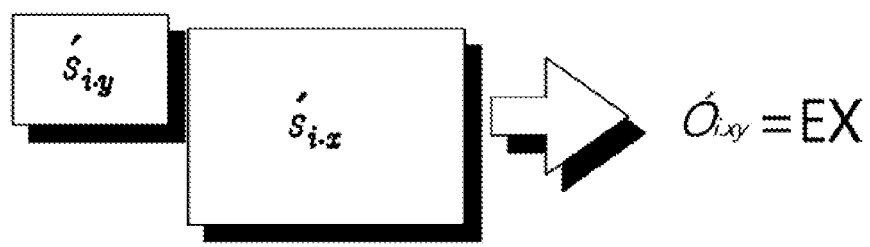
Figure 9C:
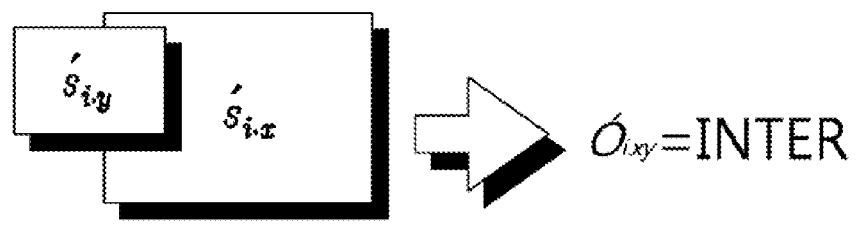

FIG. 8 is a block diagram of a sub-segment block correlation detection unit in the handwritten signature characteristics acquisition unit according to an embodiment of the present disclosure. Also, FIGS. 9A-9C illustrate a method of generating an inclusion relation of sub-segment blocks which is one of correlation information between the segment blocks according to an embodiment of the present disclosure, FIGS. 10A-10D illustrate a method of generating a positional relation of sub-segment blocks which is one of correlation information between the segment blocks to according an embodiment of the present disclosure, and FIGS. 11A-11D illustrate a method of generating a positional relation of sub-segment blocks which is one of correlation information between the segment blocks according to an embodiment of the present disclosure. FIG. 12 illustrates an exemplary handwritten signature authentication method according to an embodiment of the present disclosure.

The sub-segment block correlation detection unit 670 includes an intersection space detection unit 671, an intersection space ratio detection unit 672, a sub-segment block inclusion relation detection unit 673, a sub-segment block positional relation detection unit 674, a sub-segment block edge positional relation detection unit 675, and a correlation characteristics information generation unit 677.

The intersection space detection unit 671 receives sub-segment block ($\acute{s}_{i,x}$) from the spatial-division segment block characteristics detection unit 650, and analyzes received sub-segment block ($\acute{s}_{i,x}$) and one or more of adjacent sub-segment blocks ($\acute{s}_{i,y}$) to check whether there is an intersection space between the received sub-segment block ($\acute{s}_{i,x}$) and the adjacent sub-segment blocks ($\acute{s}_{i,y}$). If there is any intersection space between the received sub-segment block ($\acute{s}_{i,x}$) and the adjacent sub-segment blocks ($\acute{s}_{i,y}$), the intersection space detection unit 671 calculates a size of the intersection space between the received sub-segment block ($\acute{s}_{i,x}$) and the adjacent sub-segment blocks ($\acute{s}_{i,y}$) and generates and outputs intersection space information ($\acute{\delta}_{i,xy}$).

In the examples shown in FIGS. 3 and 6, the intersection space detection unit 671 checks whether there is an intersection space between a sub-segment block ($\acute{s}_{0,0}$)(2-1-1) and an adjacent sub-segment block ($\acute{s}_{0,1}$)(2-1-2) in the segment block (so). Since there is an intersection space between the sub-segment block ($\acute{s}_{0,0}$)(2-1-1) and the adjacent sub-segment block ($\acute{s}_{0,1}$)(2-1-2), the intersection space detection unit 671 calculates the size of the intersection space between the sub-segment block ($\acute{s}_{0,0}$)(2-1-1) and the adjacent sub-segment block ($\acute{s}_{0,1}$)(2-1-2) and outputs the intersection space information ($\acute{\delta}_{0,01}$).

Similarly, since there is an intersection space between the sub-segment block ($\acute{s}_{0,1}$) and the adjacent sub-segment block ($\acute{s}_{0,2}$), the intersection space detection unit 671 calculates the size of the intersection space between the sub-segment block ($\acute{s}_{0,1}$) and the adjacent sub-segment block ($\acute{s}_{0,2}$) and outputs the intersection space information ($\acute{\delta}_{0,12}$).

In the same manner, the intersection space detection unit 671 calculates the size of the intersection space between the sub-segment block ($\acute{s}_{0,2}$) and the adjacent sub-segment block ($\acute{s}_{0,3}$) to output the intersection space information ($\acute{\delta}_{0,23}$), and calculates the size of the intersection space between the sub-segment block ($\acute{s}_{0,3}$) and the adjacent sub-segment block ($\acute{s}_{0,4}$) to output the intersection space information ($\acute{\delta}_{0,34}$).

The intersection space ratio detection unit 672 receives the segment block space information (space($s_i$)) and the sub-segment block space information (space(six)) from the segment block space characteristics detection unit 653 of the segment block characteristics detection unit 650, receives the overall handwritten signature block space information (space(S)) from the overall handwritten signature block characteristics detection unit 660, receives the intersection space information ($\acute{\delta}_{i,xy}$) from the intersection space detection unit 671, and generates and outputs intersection space ratio information. The intersection space ratio information includes information of a ratio of the sub-segment block intersection space to the sub-segment block space ($\acute{\pi}_i(\acute{\delta}_{ij})$), information of a ratio of the sub-segment block intersection space to an adjacent sub-segment block space ($\acute{\pi}_j(\acute{\delta}_{ij})$), information of a ratio of the sub-segment block intersection space to the overall handwritten signature block space ($\acute{r}_{i,xy}$), which are calculated as follows:

$$\acute{\pi}_i(\acute{\delta}_{ij}) = \frac{\acute{\delta}_{i,xy}}{\text{space}(\acute{s}_{i,x})}$$

$$\acute{\pi}_j(\acute{\delta}_{ij}) = \frac{\acute{\delta}_{i,xy}}{\text{space}(\acute{s}_{i,y})}$$

$$\acute{r}_{i,xy}(\acute{\delta}_{ij}) = \frac{\acute{\delta}_{i,xy}}{\text{space}(S)}$$

In addition, the intersection space ratio detection unit 672 may further calculate a ratio of the segment block space (space($s_i$)) to the overall handwritten signature block (S) and output overall handwritten signature space ratio information.

The segment block inclusion relation detection unit 673 determines an inclusion relation between the sub-segment block ($\acute{s}_{i,x}$) and the adjacent sub-segment block ($\acute{s}_{i,y}$) and outputs sub-segment block inclusion relation information ($ó_{i,xy}$) according to a determination result. The sub-segment block inclusion relation information that is stored according to the present disclosure may have one of three states: inclusion (IN), non-inclusion (exclusion)(EX), and intersection (INTER). When the adjacent sub-segment block ($ś_{i,y}$) is included in the sub-segment block ($ś_{i,x}$) as shown in FIG. 9A, the sub-segment block inclusion relation detection unit 673 generates the sub-segment block inclusion relation information having a state indicating "inclusion (IN)." When the adjacent sub-segment block ($ś_{i,y}$) is located outside the sub-segment block ($ś_{i,x}$) as shown in FIG. 9B, the sub-segment block inclusion relation detection unit 673 generates the sub-segment block inclusion relation information having a state indicating "non-inclusion (EX)." When the adjacent sub-segment block ($ś_{i,y}$) partially or totally intersects the sub-segment block ($ś_{i,x}$) as shown in FIG. 9C, the sub-segment block inclusion relation detection unit 673 generates the sub-segment block inclusion relation information having a state indicating "intersection (INTER)."

The sub-segment block positional relation detection unit 674 generates and outputs sub-segment block positional relation information ($pós_{i,xy}$) which represents position information of the adjacent sub-segment block ($ś_{i,y}$) with respect to the sub-segment block ($ś_{i,x}$).

Figure 10A:
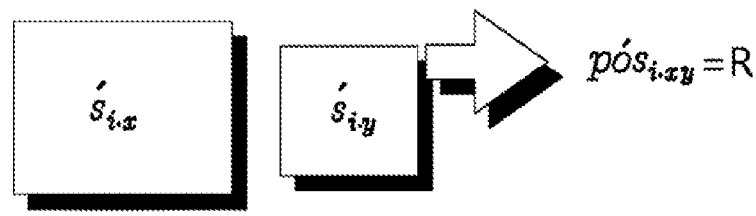
FIGS. 10A-10D illustrate a method of generating a positional relation of sub-segment blocks which is one of correlation information between the segment blocks to according an embodiment of the present disclosure.
Figure 10B:
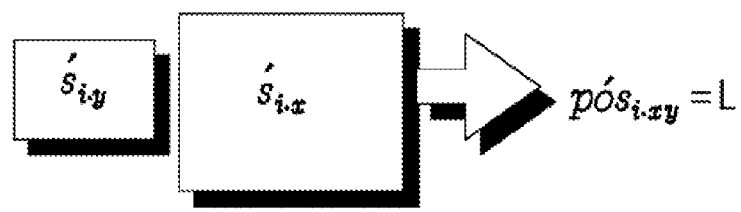
Figure 10C:
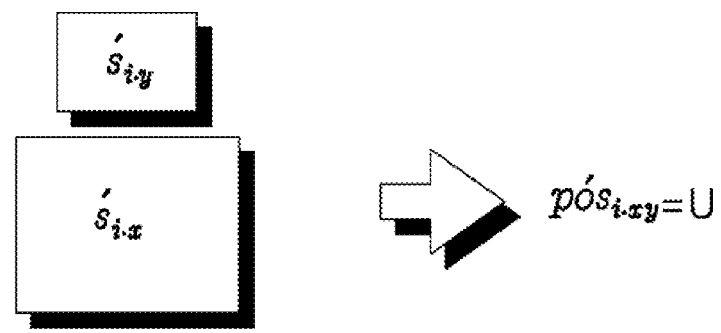
Figure 10D:
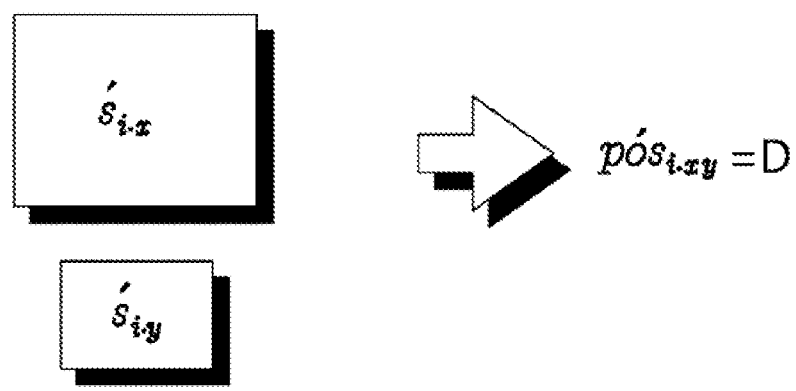

Examples of positional relations of the sub-segment blocks are illustrated in FIGS. 10A-10D. When the adjacent sub-segment block ($ś_{i,y}$) is located to the right of the sub-segment block ($ś_{i,x}$) as shown in FIG. 10A, the sub-segment block positional relation detection unit 674 generates and outputs the sub-segment block positional relation information ($pós_{i,xy}$) of "R" representing a right side. When the adjacent sub-segment block ($ś_{i,y}$) is located to the left of the sub-segment block ($ś_{i,x}$) as shown in FIG. 10B, the sub-segment block positional relation detection unit 674 outputs the sub-segment block positional relation information ($pós_{i,xy}$) of "L" representing a left side. When the adjacent sub-segment block ($ś_{i,y}$) is located above the sub-segment block ($ś_{i,x}$) as shown in FIG. 10C, the sub-segment block positional relation detection unit 674 outputs the sub-segment block positional relation information ($pós_{i,xy}$) of "U" representing upside. When the adjacent sub-segment block ($ś_{i,y}$) is located below the sub-segment block ($ś_{i,x}$) as shown in FIG. 10D, the sub-segment block positional relation detection unit 674 outputs the sub-segment block positional relation information ($pós_{i,xy}$) of "D" representing downside.

The sub-segment block edge positional relation detection unit 675 receives intersection information between the sub-segment block ($ś_{i,x}$) the adjacent sub-segment block ($ś_{i,y}$) from the intersection space ratio detection unit 672. In case that the sub-segment block ($ś_{i,x}$) intersects the adjacent sub-segment block ($ś_{i,y}$), the sub-segment block edge positional relation detection unit 675 determines which edge of the sub-segment block ($ś_{i,x}$) intersects the adjacent sub-segment block ($ś_{i,y}$), and outputs sub-segment block edge positional relation information ($édge_{i,y}$) that represents the edge of the sub-segment block ($ś_{i,x}$) intersecting the adjacent sub-segment block ($ś_{i,y}$).

Figure 11A:
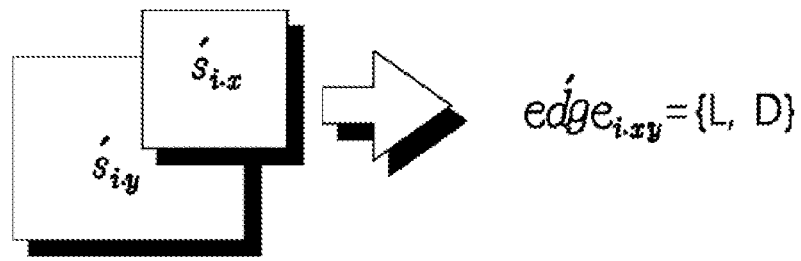
FIGS. 11A-11D illustrate a method of generating a positional relation of sub-segment blocks which is one of correlation information between the segment blocks according to an embodiment of the present disclosure.

Examples of the sub-segment block positional relations between sub-segment blocks are illustrated in FIGS. 11A-11D. When the adjacent sub-segment block ($ś_{i,y}$) is located in a down-left position of the sub-segment block ($ś_{i,x}$) and the left and bottom edges of the sub-segment block ($ś_{i,x}$) intersects the adjacent sub-segment block ($ś_{i,y}$) as shown in FIG. 11A, the sub-segment block edge positional relation detection unit 675 outputs the sub-segment block edge positional relation information ($édge_{i,xy}$) of {L, D} which represents that the left and bottom edges of the segment block ($s_i$) intersects the adjacent sub-segment block ($ś_{i,y}$).

Figure 11B:
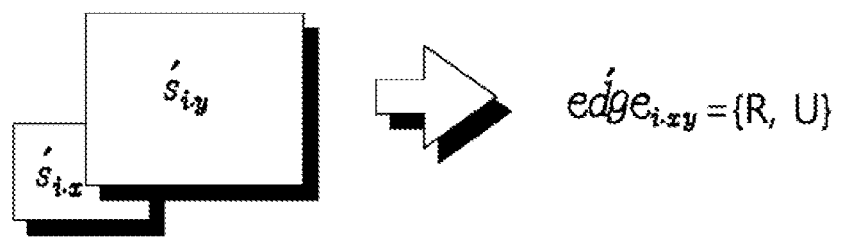
Figure 12:
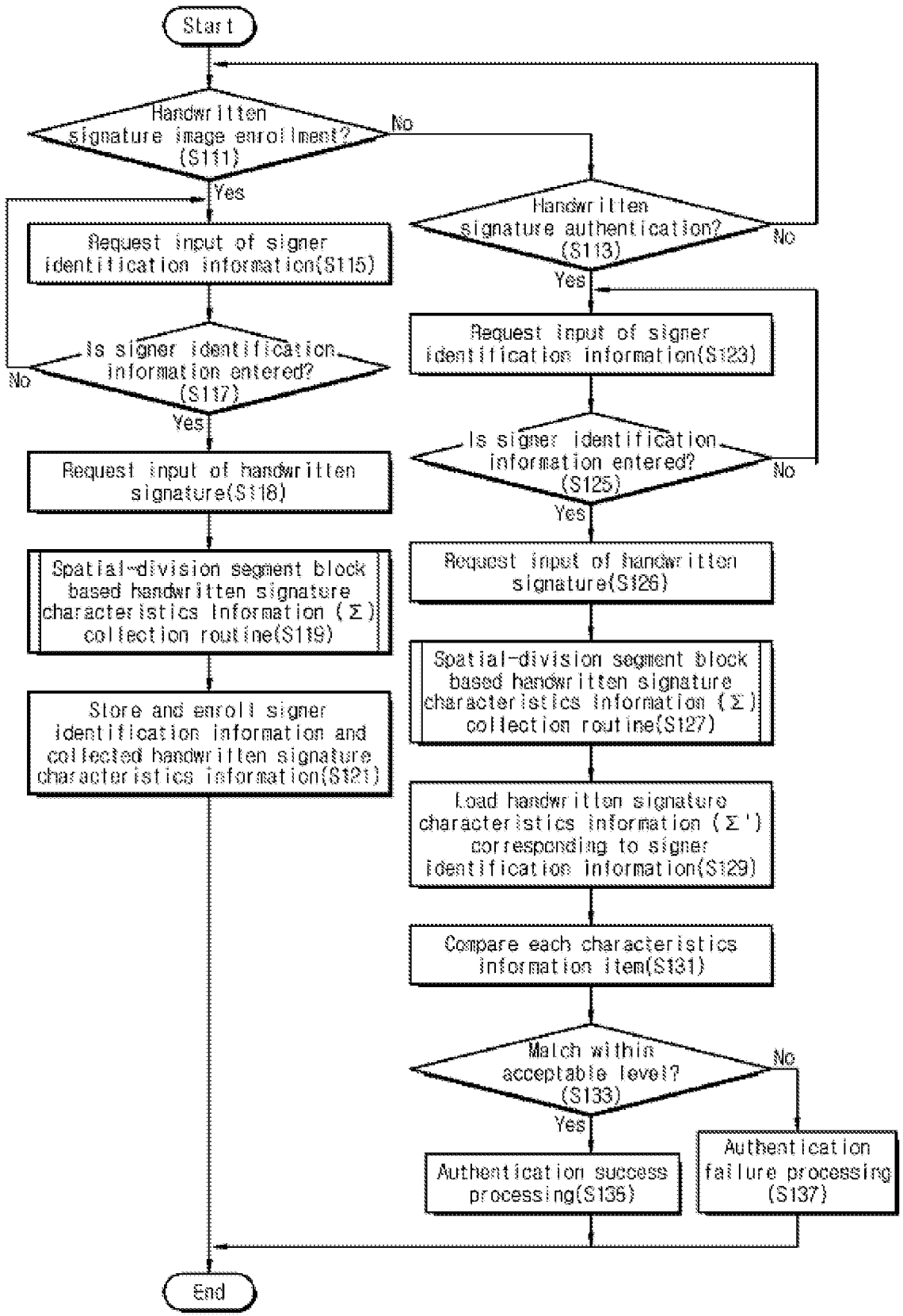
FIG. 12 is a flowchart illustrating a handwritten signature authentication method based on dynamic movement tracking of spatial-division segment blocks according to an embodiment of the present disclosure.

When an adjacent segment block ($s_j$) is located in an up-right position of the sub-segment block ($ś_{i,x}$) and the right and top edges of the sub-segment block ($ś_{i,x}$) intersects the adjacent sub-segment block ($ś_{i,y}$) as shown in FIG. 11B, the sub-segment block edge positional relation detection unit 675 outputs the sub-segment block edge positional relation information ($édge_{i,xy}$) of {R, U}.

Figure 11C:
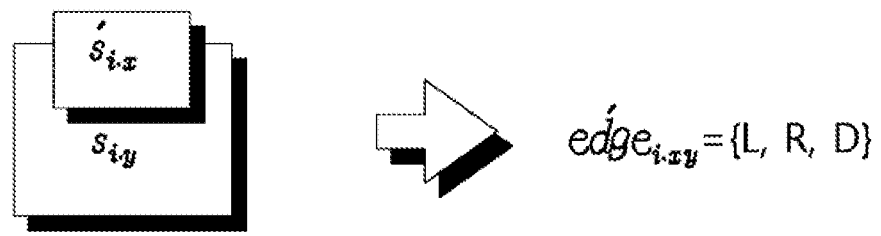

When the adjacent sub-segment block ($ś_{i,y}$) is located in a downward position of the sub-segment block ($ś_{i,x}$) and the left, right, and bottom edges of the sub-segment block ($ś_{i,x}$) intersects the adjacent sub-segment block ($ś_{i,y}$) as shown in FIG. 11C, the sub-segment block edge positional relation detection unit 675 outputs the sub-segment block edge positional relation information ($édge_{i,xy}$) of {L, R, D}.

Figure 11D:
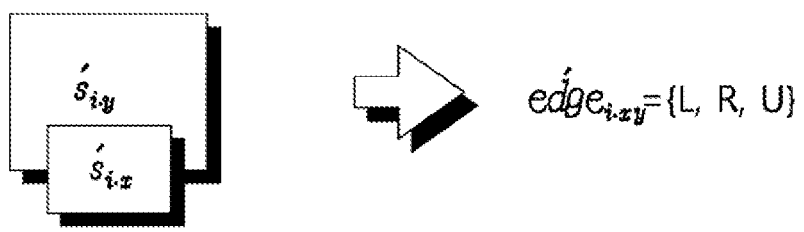

When the adjacent sub-segment block ($ś_{i,y}$) is located in a upward position of the sub-segment block ($ś_{i,x}$) and the left, right, and top edges of the sub-segment block (six) intersects the adjacent sub-segment block ($ś_{i,y}$) as shown in FIG. 11D, the sub-segment block edge positional relation detection unit 675 outputs the sub-segment block edge positional relation information ($édge_{i,xy}$) of {L, R, U}.

The correlation characteristics information generation unit 677 receives the intersection space ratio information, the sub-segment block inclusion relation information ($ó_{i,xy}$), the sub-segment block positional relation information ($pós_{i,xy}$), and the sub-segment block edge positional relation information ($édge_{i,xy}$) from the intersection space ratio detection unit 672, the sub-segment block inclusion relation detection unit 673, the sub-segment block positional relation detection unit 674, and the sub-segment block edge positional relation detection unit 675, respectively, and generates correlation characteristics information ($ć_{i,xy}$) including those information. After the correlation characteristics information ($ć_{i,xy}$) is generated for all segment blocks, the correlation characteristics information generation unit 677 generates and outputs overall segment block correlation characteristics information (C).

The correlation characteristics information ($ć_{i,xy}$) and the overall segment block correlation characteristics information (C) may be expressed by Equations 10 and 11, respectively.

$$ć_{i,xy} = \{δ_{i,xy}, ŕ_{i,xy}, π_i(δ_{ij}), ó_{i,xy}, pós_{i,xy}, édge_{i,xy}\}$$

$$ć_i = \{ć_{i,xy} | x=0,1,2,\ldots,(m-1) \text{ and } y=0,1,2,\ldots,(m-1)\} \quad \text{[Equation 10]}$$

where $ś_{i,x} \in s_i, ś_{i,y} \in s_i$ and $s_i \in S$ $$C = \{ć_i | i=0,1,2,\ldots,(n-1)\} \text{ where } s_i \in S \quad \text{[Equation 11]}$$

FIG. 12 is a flowchart illustrating a handwritten signature authentication method based on dynamic movement tracking of spatial-division segment blocks according to an embodiment of the present disclosure.

Referring to FIG. 12, the control unit 510 monitors whether handwritten signature enrollment is requested by a command for handwritten signature enrollment through the input unit 200 (S111) or whether handwritten signature authentication is requested by a command for handwritten signature authentication (S113).

When the handwritten signature enrollment is requested, the control unit 510 requests the input of the signer's identification information (S115) and monitors whether the signer identification information is entered (S117).

After the signer identification information is entered, the control unit 510 requests the signer to handwrite a signature (S118).

Afterwards, the control unit 510 collects spatial-division segment block based handwritten signature characteristics information (Σ) by performing a spatial-division segment block based handwritten signature characteristics information acquisition routine (S119), maps the collected spatial-division segment block based handwritten signature characteristics information (Σ) to the signer identification information, and stores the collected spatial-division segment block-based handwritten signature characteristics information (Σ) in the enrollment unit 100 (S121).

On the other hand, when the handwritten signature authentication is requested, the control unit 510 requests the input of the signer's identification information (S123) and monitors whether the signer identification information is entered (S125).

After the signer identification information is entered, the control unit 510 requests the signer to handwrite a signature through the output unit 300 (S126).

Afterwards, the control unit 510 collects spatial-division segment block based handwritten signature characteristics information (Σ) by performing a spatial-division segment block-based handwritten signature characteristics information acquisition routine through the handwritten signature characteristics extraction unit 520 (S127), loads, from the enrollment unit 100, the enrolled handwritten signature characteristics information (Σ') that corresponds to the input signer identification information through a handwritten signature segment block authentication unit 560 (S129).

After the enrolled handwritten signature characteristics information (Σ') is loaded, the control unit 510 compares the enrolled handwritten signature characteristics information (Σ') with the received handwritten signature characteristics information (Σ) through the handwritten signature segment block authentication unit 560 (S131). The control unit 510 may further compare enrolled handwritten signature behavioral characteristics information with collected handwritten signature behavioral characteristics information.

The control unit 510 determines, through the handwritten signature segment block authentication unit 560, whether the match rate for each characteristics item reaches a predetermined match rate (S133). The control unit 510 conducts authentication success processing if the match rate is greater than or equal to the predetermined match rate (S135), and conducts authentication failure processing if the match rate is below the predetermined match rate (S137).

Figure 13:
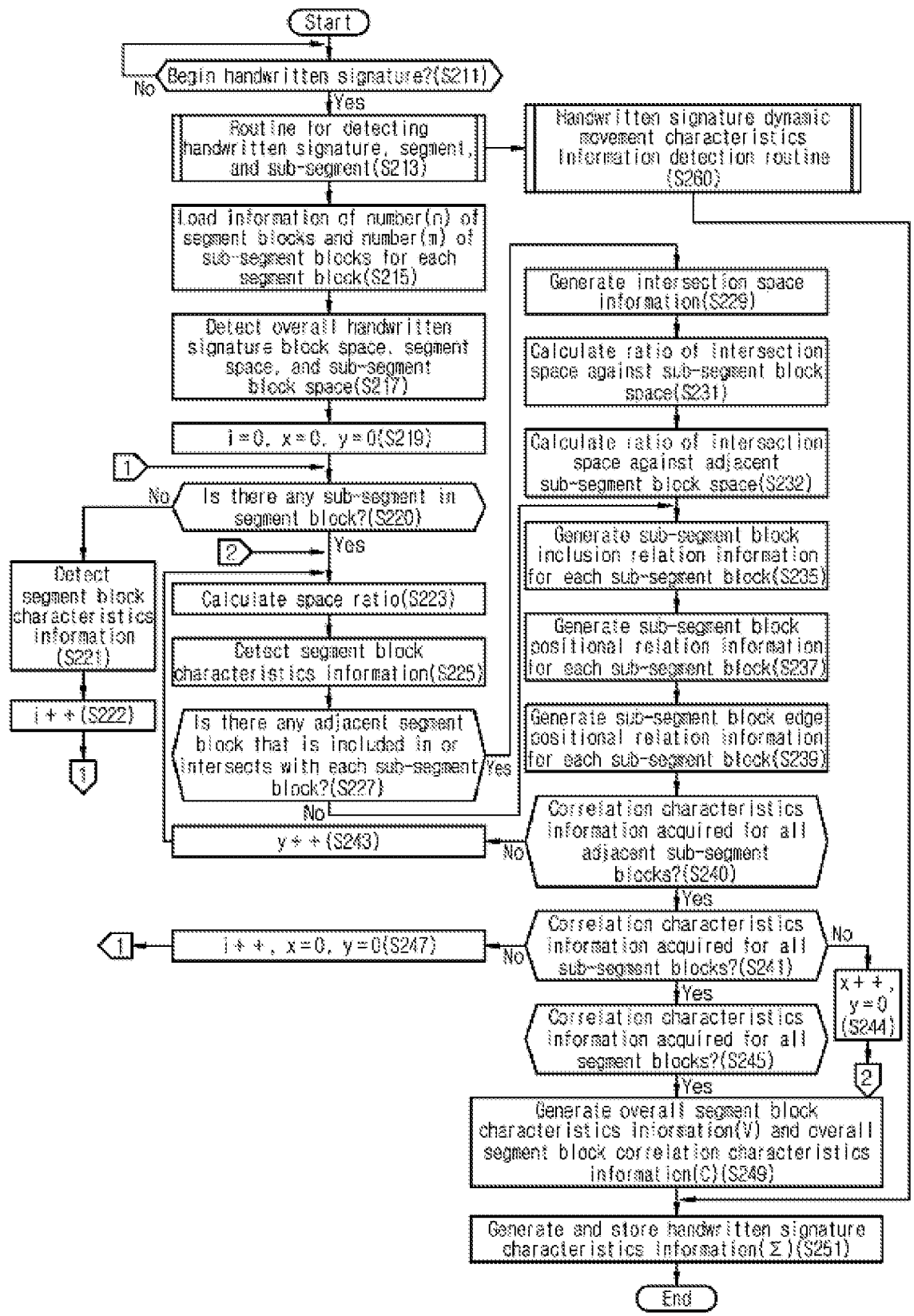
FIG. 13 is a flowchart illustrating a method of collecting handwritten signature characteristics data in the handwritten signature authentication method based on dynamic movement tracking of spatial-division segment blocks according to an embodiment of the present disclosure.

FIG. 13 is a flowchart illustrating a method of collecting handwritten signature characteristics data in the handwritten signature authentication method based on dynamic movement tracking of spatial-division segment blocks according to an embodiment of the present disclosure.

The control unit 510 monitors whether the touch data, which is the handwritten signature input data, begins to be entered from the touch input unit 420, through at least one of a handwritten signature tracking unit 530, a handwritten signature image acquisition unit 540, and a handwritten signature characteristics acquisition unit 550 (S211).

When monitoring the input of the touch data is started, the control unit 510 performs a routine for detecting handwritten signature, segments, and sub-segments to detect the handwritten signature, the segments, the segment blocks, the sub-segments, and the sub-segment blocks. Also, the control unit 510 detects and stores information including the corresponding segment images, the sub-segment images, the handwritten signature image, the segment blocks, the sub-segment blocks, and the overall handwritten signature block (S) (S213). The routine for detecting the segments and sub-segments will be described below in detail with reference to FIG. 14.

After the overall handwritten signature block, the handwritten signature image, the segment images, the segment blocks, the sub-segment images, and the sub-segment blocks are generated, the control unit 510 performs a handwritten signature dynamic movement characteristics information detection routine to detect the dynamic movement point information ($\alpha_i$) and generates and outputs the handwritten signature dynamic movement characteristics information ($\psi_i$, Ψ) based on the dynamic movement point information ($\alpha_i$) (S260). The method of detecting the dynamic movement characteristics information will be described below with reference to FIG. 14.

Simultaneously with the start of the detection operation of the handwritten signature dynamic movement characteristics information, the control unit 510 loads information of the number (n) of segment blocks and the number (m) of sub-segment blocks of each segment block through the spatial-division segment block characteristics detection unit 650 (S215).

Also, the control unit 510 calculates space area of the overall handwritten signature block (S), the segment block ($s_i$), and the sub-segment block ($\acute{s}_{i,x}$) to generate the overall handwritten signature block space information (space(S)), the segment block space information (space($s_i$)), and the sub-segment block space information (space($\acute{s}_{i,x}$)) (S217).

After the acquisition of the space information, the control unit 510 may calculate the ratio of the segment block space (space($s_i$)) to the overall handwritten signature block space to generate the information of the ratio ($\Delta_i$) of the segment block space to the overall handwritten signature block space.

After the acquisition of the space information of the segment blocks and the sub-segment blocks, the control unit 510 initializes the segment block index (i), the sub-segment block index (x), and the adjacent sub-segment block index (y) (S219).

After variables are initialized, the control unit 510 determines whether there is any sub-segment block in the current segment block (S220).

In the case that there is no sub-segment block in the current segment block, the control unit 510 generates the segment block characteristics information ($v_i$) (S221), increments the segment block index (i) by one, and performs again the operations after the operation S220.

In the case that there is at least one sub-segment block in the current segment block, the control unit 510 calculates the information of the ratio ($\Delta_{i,x}$) of the sub-segment block space to the overall handwritten signature block space and the information of the ratio ($\acute{\varepsilon}_{i,x}$) of the sub-segment block space to the segment block space (S223).

After the sub-segment block space ratio information is generated, the control unit 510 generates the segment block characteristics information ($v_i$) and the sub-segment block characteristics information ($\acute{v}_i$) (S225).

After the segment block characteristics information ($v_i$) and the sub-segment block characteristics information ($\acute{v}_i$) are generated, the control unit 510 checks whether there is any adjacent segment block that forms the inclusion or intersection relationship with each of the segment blocks (S227).

If there is an adjacent segment intersecting or being included in the segment block, the control unit 510 generates the intersection space information ($\delta_{i,xy}$) by calculating space area of the inclusion space or the intersection space formed by the sub-segment block ($\acute{s}_{i,x}$) and the adjacent sub-segment block ($\acute{s}_{i,y}$) (S229).

When the intersection space information ($\delta_{i,xy}$) is generated, the control unit 510 generates the sub-segment block intersection space ratio information ($\tilde{\pi}_j(\delta_{ij})$), which is the ratio of the overlapping intersection space ($\delta_{i,xy}$) to the sub-segment block space ($\acute{s}_{i,x}$) (S231).

Furthermore, the control unit 510 generates the adjacent segment block intersection space ratio information ($\tilde{\pi}_j(\delta_{ij})$), which is the ratio of the overlapping intersection space ($\delta_{i,xy}$) to the space ($\acute{s}_{i,y}$) of the adjacent sub-segment block forming the intersection space with the sub-segment block space ($s_{i,x}$) (S232).

The control unit 510 generates the sub-segment block inclusion relation information ($\acute{o}_{i,xy}$) that represents whether an adjacent sub-segment block ($\acute{s}_{i,y}$) is included in each sub-segment block ($\acute{s}_{i,x}$) or not, the sub-segment block positional relation information ($\acute{pos}_{i,xy}$) that represents relative position information of all adjacent sub-segment blocks ($s_j$) with respect to the sub-segment block ($\acute{s}_{i,x}$), and the sub-segment block edge positional relation information ($\acute{edge}_{i,xy}$) that represents the edge of the sub-segment block ($\acute{s}_{i,x}$) intersecting the adjacent sub-segment block ($\acute{s}_{i,y}$) (S235, S237, and S239).

When the correlation characteristics information for one sub-segment block and adjacent sub-segment blocks is generated as above, the control unit 510 determines whether the correlation characteristics information is generated for all the adjacent sub-segments included in the sub-segment block (S240).

If there remains any adjacent sub-segment for which the correlation characteristics information is not generated yet, the control unit 510 increments the adjacent sub-segment index (y) by one (S243) and carries out the operation S223 and following operations to acquire the correlation characteristics information ($\acute{c}_{i,xy}$) for all the adjacent sub-segments in the sub-segment block.

If the correlation characteristics information is acquired for all the adjacent sub-segments included in the sub-segment block, however, the control unit 510 checks whether the correlation characteristics information is acquired for all the sub-segment blocks of the handwritten signature (S241).

If there remains any sub-segment block for which the generation of the correlation characteristics information is not completed, the control unit 510 increments the sub-segment block index (x) by one (S244), initializes the adjacent sub-segment block index (y) (i.e. y=0), and carries out the operation S223 and the following operations to acquire the correlation characteristics information ($\acute{c}_{i,xy}$) for all the adjacent sub-segments in the sub-segment block related with the handwritten signature.

If the correlation characteristics information is acquired for all the adjacent sub-segments included in the segment block, however, the control unit 510 checks whether the correlation characteristics information is acquired for all the segment blocks of the handwritten signature (S245).

If there remains any segment block for which the generation of the correlation characteristics information is not completed, the control unit 510 initializes the sub-segment block index (x) and the adjacent sub-segment block index (y) (i.e. x=0, y=0), increments the segment block index (i) by one (S247), and carries out the operation S220 and the following operations to acquire the correlation characteristics information ($\acute{c}_{i,xy}$) for all the sub-segment blocks in all the segment blocks related with the handwritten signature.

When the correlation characteristics information are acquired for all the segment blocks, the control unit 510 generates the overall segment block characteristics information (V) and the overall segment block correlation characteristics information (C) (S249).

When the overall segment block characteristics information and the overall segment block correlation characteristics information are acquired, the control unit 510 generates the handwritten signature characteristics information ($\Sigma$) including all the information described above to store in the enrollment unit 100 (S255).

Figure 14:
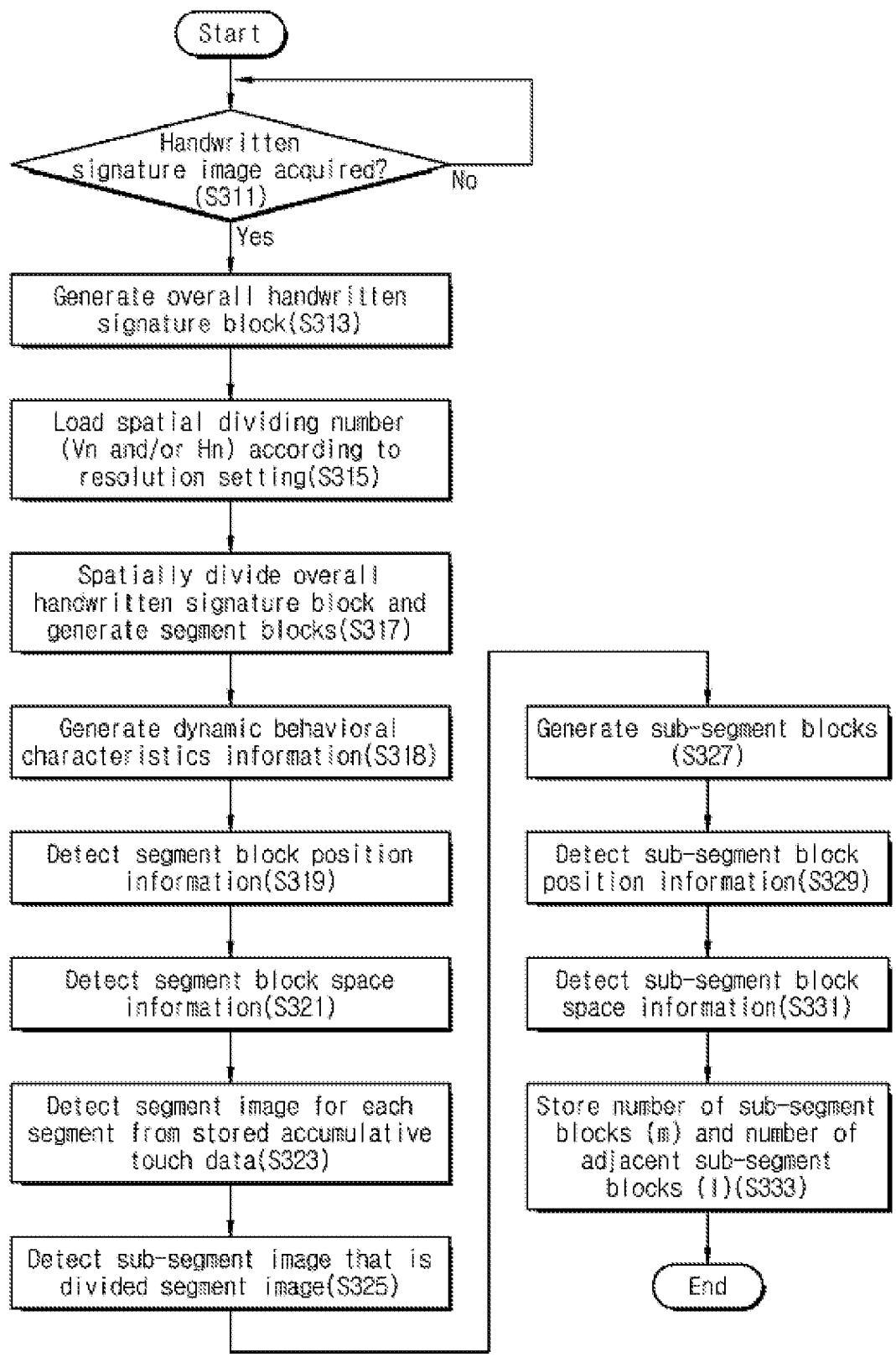
FIG. 14 is a flowchart illustrating a method of generating a spatial-division segment block according to an embodiment of the present disclosure.

FIG. 14 is a flowchart illustrating a method of generating a spatial-division segment block according to an embodiment of the present disclosure.

Referring to FIG. 14, the control unit 510 checks whether the handwritten signature is terminated through the handwritten signature end detection unit 620 and whether the handwritten signature image is acquired through the spatial-division segment detection unit 630 (S311).

After the acquisition of the handwritten signature image, the control unit 510 generates the overall handwritten signature block (S313) and loads a spatial dividing level (n) (S315). The spatial dividing level may include only a vertical space dividing level (Vn) in case of performing only a vertical dividing, may include only a horizontal space dividing level (Hm) in case of performing only a horizontal dividing, and may include both the horizontal space dividing level (Hm) and the vertical space dividing level (Vn) in case where both the horizontal dividing and the vertical dividing is performed.

When the spatial dividing level is loaded, the control unit 510 spatially divides the overall handwritten signature block by the spatial dividing level (n) which is set previously according to a desired handwritten signature authentication precision (S317). In case where only the vertical dividing is performed, the control unit 510 divides the overall handwritten signature block (1) by the spatial dividing level (n) to generate $2^2$ segment blocks as shown in FIGS. 3 and 6 (S317). In case where only the horizontal dividing is performed, the control unit 510 divides the overall handwritten signature block (1) by the spatial dividing level (n) to generate $2^2$ segment blocks as shown in FIG. 4 (S317).

After the generation of the segment blocks, the control unit 510 generates the segment dynamic behavioral characteristics information ($\psi_i$) and the overall segment dynamic behavioral characteristics information ($\Psi$), and detects the segment block position information ($p_i$) (S319).

After the detection of the segment block position information ($p_i$), the control unit 510 detects the segment block space information (space($s_i$)) by calculating the space area of each segment block based on the segment block position information ($p_i$) (S321).

After the generation of the segment block space information (space($s_i$)), the control unit 510 detects the segment image of each segment block from the stored accumulative touch data (S323).

After the detection of the segment image, the control unit 510 analyzes the detected segment image to check whether there exist any sub-segment image, and detects the sub-segment image if there exists the sub-segment image (S325).

When the sub-segment image is detected, the control unit 510 generates the the sub-segment block ($\acute{s}_{i,x}$) including the sub-segment image (S327).

Also, when the sub-segment image is detected, the control unit 510 detects the sub-segment block position information ($\acute{p}_{i,x}$) which is the position information of the the sub-segment block ($\acute{s}_{i,x}$) (S329).

After the generation of the sub-segment block position information ($\acute{p}_{i,x}$), the control unit 510 detects the sub-segment block space information (space($\acute{s}_{i,x}$)) (S331).

When the sub-segment block space information is generated, the control unit 510 counts and stores the number (m) of the sub-segment blocks and the number (I) of the adjacent sub-segment blocks (S331). For example, the number of the adjacent sub-segment block of the first sub-segment block (2-1-1) in the first segment block (2-1) is one (i.e. adjacent sub-segment block 2-1-2), and the number of the adjacent sub-segment blocks of the second sub-segment block (2-1-2) is two (i.e. adjacent sub-segment blocks 2-1-1 and 2-1-3).

Now, the method of generating the dynamic movement point information ($\alpha_i$) and the method of generating the segment dynamic behavioral characteristics information ($\psi_i$) from the dynamic movement point information ($\alpha_i$) and the overall segment dynamic behavioral characteristics information ($\Psi$) will be described in detail.

The dynamic movement tracking unit 690 generates the dynamic movement point information ($\alpha_i$) describing each point constituting the handwritten signature as shown in FIGS. 3 and 4.

The dynamic movement point information ($\alpha_i$) (hereinafter, referred to as "point" for the convenience of explanation) may be composed as shown in Equation 12.

$$\alpha_i = (*prev, id, x, y, ts, sid, rid, *next) \quad \text{[Equation 12]}$$

Here, '$\alpha_i$.prev' denotes a point indicating a point ($\alpha_{(i-1)}$), '$\alpha_i$.id' denotes a point identification number (i.e. 'i'), corresponding to the point ($\alpha_i$), '$\alpha_i$.x' denotes x-coordinate of the point ($\alpha_i$), '$\alpha_i$.y' denotes y-coordinate of the point ($\alpha_i$), '$\alpha_i$.ts' denotes a timestamp value of the point ($\alpha_i$), '$\alpha_i$.sid' denotes a spatial-division segment ID of the segment to which the point ($\alpha_i$) belongs, '$\alpha_i$.gid' denotes a group ID of a group, disjointed from the segment block, to which the point ($\alpha_i$) belongs, and '$\alpha_i$.next' denotes a point indicating a point ($\alpha_{(i+1)}$). Therefore, '$\alpha_i$.sid' represents the segment the point ($\alpha_i$) belongs among the spatially-divided segments, and '$\alpha_i$.gid' represents the group the point ($\alpha_i$) belongs among the groups generated by disjointing one or more segments.

Though the dynamic movement point information ($\alpha_i$) expressed by the Equation 12 contains point elements including information of the previous dynamic movement point, x- and y-coordinates of the dynamic movement point, the timestamp value, the spatial-division segment ID, the group ID of dynamic movement point, and the next dynamic movement point, the dynamic movement point information may be composed to contain at least one of the elements or to contain additional information.

The overall handwritten signature block (S) is a set of the segment blocks ($s_i$) divided spatially and may be composed as shown in Equation 13.

$$S = \{s_i | i = 0, 1, 2, \ldots, (n-1)\} \quad \text{[Equation 13]}$$

Also, a set of points included in the segment block ($s_i$) may be composed as shown in Equation 14.

$$\#_i = \{\alpha_0, \alpha_1, \alpha_2, \ldots, \alpha_{(bcnt-1)}\} \quad \text{[Equation 14]}$$

where $\alpha_k$.sid=i, (i=0, 1, 2, . . . , (n−1)), bcnt=COUNT($\#_i$)

Thus, a set (AP) of all the points comprising the handwritten signature may be composed as shown in Equation 15.

$$AP = \{\#_0, \#_1, \#_2, \ldots, \#_{(n-1)}\} \text{ where APcnt=COUNT(AP)} \quad \text{[Equation 15]}$$

A function for determining whether any two points ($a_j$, $a_k$, j≠k) belong to a same segment block ($s_i$) is defined by Equation 16.

$$SameSEG(\alpha_j, \alpha_k, s_i) = \begin{cases} TRUE & \text{where } \alpha_j \cdot sid = \alpha_k \cdot sid = 1 \\ FALSE & \text{otherwise} \end{cases} \quad \text{[Equation 16]}$$

That is, in case that two points ($a_j$, $a_k$, j≠k) belong to the same segment block ($s_i$), the segment ID's of the two points ($a_j$, $a_k$) are the same as each other (i.e. $\alpha_j$.sid=$a_k$.sid). On the other hand, in case that two points ($a_j$, $a_k$, j≠k) belong to different segment blocks, the segment ID's of the two points ($a_j$, $a_k$) are different from each other (i.e. $\alpha_j$.sid≠$a_k$.sid).

A function for determining whether any two points ($a_j$, $a_k$, j≠k) belong to a same group that may be disjointed from the segment block is defined by Equation 17.

$$SameGROUP(\alpha_j, \alpha_k) = \begin{cases} TRUE & \text{where } \alpha_j \cdot gid = \alpha_k \cdot gid \\ FALSE & \text{otherwise} \end{cases} \quad \text{[Equation 17]}$$

That is, in case that two points ($a_j$, $a_k$, j≠k) belong to the same group, the group ID's of the two points ($a_j$, $a_k$) are the same as each other (i.e. $\alpha_j$.gid=$a_k$.gid), which indicates that the points are not disjointed into separate groups. On the other hand, in case that two points ($a_j$, $a_k$, j≠k) belong to different groups, the group ID's of the two points ($a_j$, $a_k$) are different from each other (i.e. $\alpha_j$.gid≠$a_k$.gid), which indicates that the points are disjointed into separate groups.

A function for determining connection characteristics, that is, whether any two points ($a_j$, $a_k$, j≠k) are connected in a same segment block ($s_i$) is defined by Equation 18, and a set of all the possible connection characteristics is defined by Equation Equation 19.

$$Connected(\alpha_j, \alpha_k, s_i) = \begin{cases} TRUE & \text{where } \exists \alpha_l \in \#_i \text{ such as} \\ & ((j < l < k) \wedge \\ & (\alpha_j \cdot ts < \alpha_l \cdot ts < \alpha_k \cdot ts) \wedge \\ & (SameSEG(\alpha_j, \alpha_l, s_i) \wedge \\ & (SameSEG(\alpha_l, \alpha_k, s_i) \wedge \\ & (SameSEG(\alpha_j, \alpha_k, s_i) \wedge \\ & (SameGROUP(\alpha_j, \alpha_l) \wedge \\ & (SameGROUP(\alpha_l, \alpha_k) \wedge \\ & (SameGROUP(\alpha_j, \alpha_k)) \\ FALSE & \text{otherwise} \end{cases} \quad \text{[Equation 18]}$$

-continued $$LINK_i = \left\{ (j, k, \text{length}(j, k)) \,\middle|\, \begin{array}{l} \exists\, \alpha_j \text{ and } \alpha_k \in \#_i \text{ such as } (j < k), \\ (\alpha_j \cdot ts < \alpha_l \cdot ts) \text{ and } (\text{Connected}(\alpha_j, \alpha_k, s_i) = \text{TRUE}) \end{array} \right\}$$

[Equation 19]

Here, 'length(j, k)' means a distance between the two points ($a_j$, $a_k$).

Marginal termination points at each edge of the segment ($s_i$) is calculated by Equation 20, internal termination points in the segment ($s_i$) is calculated by Equation 21, and all the termination points in the segment ($s_i$) is calculated by Equation 22.

Left_DOT$_i$={left$_{i0}$,left$_{i1}$,left$_{i2}$, . . . ,left$_{i(Lcnt_i-1)}$} where Lcnt$^i$=COUNT(Left_DOT$_i$), Left_DOT$_i \subseteq \#_i$

Right_DOT$_i$={right$_{i0}$,right$_{i1}$,right$_{i2}$, . . . , right$_{i(Rcnt_i-1)}$} where Lcnt$^i$=COUNT(Right_DOT$_i$), Right_DOT$_i \subseteq \#_i$

Top_DOT$_i$={top$_{i0}$,top$_{i1}$,top$_{i2}$, . . . ,top$_{i(Tcnt_i-1)}$} where Lcnt$^i$ =COUNT(Top_DOT$_i$), Top_DOT$_i \subseteq \#_i$

Bottom_DOT$_i$={bottom$_{i0}$,bottom$_{i1}$,bottom$_{i2}$, . . . ,bottom$_{i(Bcnt_i-1)}$} [Equation 20]

where Bcnt$^i$ =COUNT(Bottom_DOT$_i$), Bottom_DOT$_i \subseteq \#_i$

In_DOT$_I$={in$_{i0}$,in$_{i1}$,in$_{i2}$, . . . ,in$_{(incnt_i-1)}$} [Equation 21]

where Icnt$^i$=COUNT(In_DOT$_i$), in$_i \subseteq \#_i$

Seg_DOT$_i$={Left_DOT$_i$}$\cup$ {Right_DOT$_i$}$\cup$ {Top_DOT$_i$}$\cup$ {Bottom_DOT$_i$}$\cup$ {In_DOT$_i$} [Equation 22]

where (total$^i$ =Lcntl$^i$+Rcntl$^i$ +Tcntl$^i$ +Bcntl$^i$ +incntl$^i$, (Seg_DOT$_i \subseteq \#_i$)

Therefore, all the termination points (Seg_DOT$_1$) for the segment block (2-2) shown in FIG. 3 may be calculated as follows:

Left_DOT$_1$={left$_{10}$,left$_{11}$,left$_{12}$,left$_{13}$} where Lcnt$^1$=4

Right_DOT$_1$={right$_{10}$,right$_{11}$,right$_{12}$} where Rcnt$^1$=3

Top_DOT$_1$={∅} where Tcnt$^1$=0

Bottom_DOT$_1$={∅} where Bcnt$^1$=0

In_DOT$_1$={in$_{10}$} where incnt$^1$=1

Seg_DOT$_1$={left$_{10}$,left$_{11}$,left$_{12}$,left$_{13}$,right$_{10}$,right$_{11}$,right$_{12}$,in$_{10}$} where total$^1$=8

For all the termination points (Seg_DOT$_1$) of the segment block (2-2) shown in FIG. 3 which are calculated according to the equations, two termination points (left$_{10}$, left$_{11}$) are connected to each other and there is a link between the points, two termination points (left$_{13}$,left$_{12}$) are connected to each other and there is a link between the points, two termination points (in$_{10}$, right$_{10}$) are connected to each other and there is a link between the points, and two termination points (right$_{12}$, right$_{11}$) are connected to each other and there is a link between the points. Thus, the connection characteristics among all the termination points (LINK$_1$) is calculated as follows:

$$LINK_1 = \left\{ \begin{array}{l} (left_{10} \cdot id, left_{11} \cdot id, \text{length}(left_{10} \cdot id, left_{11} \cdot id)), \\ (left_{12} \cdot id, left_{13} \cdot id, \text{length}(left_{12} \cdot id, left_{13} \cdot id)), \\ (in_{10} \cdot id, right_{10} \cdot id, \text{length}(in_{10} \cdot id, right_{10} \cdot id)), \\ (right_{12} \cdot id, right_{11} \cdot id, \text{length}(right_{12} \cdot id, right_{11} \cdot id)) \end{array} \right\}$$

where $LINKcnt_1 = 4$

Also, all the termination points (Seg_DOT$_1$) for the segment block (2-3) shown in FIG. 3 may be calculated as follows:

Left_DOT$_2$={left$_{20}$,left$_{21}$,left$_{22}$,left$_{23}$} where Lcnt$^2$=4

Right_DOT$_2$={right$_{20}$,right$_{21}$,right$_{22}$} where Rcnt$^2$=3

Top_DOT$_2$={∅} where Tcnt$^2$=0

Bottom_DOT$_2$={∅} where Bcnt$^2$=0

In_DOT$_2$={in$_{20}$} where incnt$^2$=1

Seg_DOT$_2$={left$_{20}$,left$_{21}$,left$_{22}$,left$_{23}$,right$_{20}$,right$_{21}$,right$_{22}$,in$_{20}$} where total$^2$=8

For all the termination points (Seg_DOT$_2$) of the segment block (2-3) shown in FIG. 3 which are calculated as above, two termination points (left$_{20}$, left$_{22}$) are connected to each other and there is a link between the points, two termination points (left$_2$, right$_{20}$) are connected to each other and there is a link between the points, two termination points (right$_{21}$, in$_{20}$) are connected to each other and there is a link between the points, and two termination points (left$_{23}$, right$_{22}$) are connected to each other and there is a link between the points. Thus, the connection characteristics among all the termination points (LINK$_2$) is calculated as follows:

$$LINK_2 = \left\{ \begin{array}{l} (left_{20} \cdot id, left_{22} \cdot id, \text{length}(left_{20} \cdot id, left_{22} \cdot id)), \\ (left_{21} \cdot id, right_{20} \cdot id, \text{length}(left_{21} \cdot id, right_{20} \cdot id)), \\ (right_{21} \cdot id, in_{20} \cdot id, \text{length}(right_{21} \cdot id, in_{20} \cdot id)), \\ (left_{23} \cdot id, right_{22} \cdot id, \text{length}(left_{23} \cdot id, right_{22} \cdot id)) \end{array} \right\}$$

where $LINKcnt_2 = 4$

Also, all the termination points (Seg_DOT$_3$) for the segment block (2-3) shown in FIG. 4 may be calculated as follows:

Left_DOT$_3$ = {∅} where $Lcnt^2 = 0$

Right_DOT$_3$ = {∅} where $Rcnt^2 = 0$

Top_DOT$_3$ = {top$_{20}$, top$_{21}$, top$_{22}$, top$_{23}$, top$_{24}$} where $Tcnt^2 = 5$ -continued $$Bottom\_DOT_3 =$$
$$\{bottom_{20}, bottom_{21}, bottom_{22}, bottom_{23}, bottom_{24}, bottom_{25}\}$$
$$\text{where } Bcnt^2 = 6$$

$$In\_DOT_3 = \{in_{20}\} \text{ where } incr^2 = 1$$

$$Seg\_DOT_3 =$$
$$\left\{ \begin{array}{c} top_{20}, top_{21}, top_{22}, top_{23}, top_{24}, \\ bottom_{20}, bottom_{21}, bottom_{22}, bottom_{23}, bottom_{24}, bottom_{25}, in_{20} \end{array} \right\}$$
$$\text{where } total^2 = 12$$

For all the termination points ($Seg\_DOT_3$) of the segment block (2-3) shown in FIG. 4 which are calculated as above, two termination points ($top_{20}, bottom_{20}$) are connected to each other and there is a link between the points, two termination points ($top_{22}, top_{21}$) are connected to each other and there is a link between the points, two termination points ($top_{23}, in_{20}$) are connected to each other and there is a link between the points, two termination points ($bottom_{21}, bottom_{22}$) are connected to each other and there is a link between the points, two termination points ($top_{24}, bottom_{25}$) are connected to each other and there is a link between the points, and two termination points ($bottom_{24}, bottom_{24}$) are connected to each other and there is a link between the points. Thus, the connection characteristics among all the termination points ($LINK_3$) is calculated as follows:

$$LINK_3 =$$
$$\left\{ \begin{array}{c} (top_{20} \cdot id, bottom_{20} \cdot id, \text{length}(top_{20} \cdot id, bottom_{20} \cdot id)) \\ (top_{22} \cdot id, top_{21} \cdot id, \text{length}(top_{22} \cdot id, top_{21} \cdot id)), \\ (top_{23} \cdot id, in_{20} \cdot id, \text{length}(top_{23} \cdot id, in_{20} \cdot id)), \\ (bottom_{21} \cdot id, bottom_{22} \cdot id, \text{length}(bottom_{21} \cdot id, bottom_{22} \cdot id)), \\ (top_{24} \cdot id, bottom_{25} \cdot id, \text{length}(top_{24} \cdot id, bottom_{25} \cdot id)), \\ (top_{24} \cdot id, bottom_{25} \cdot id, \text{length}(top_{24} \cdot id, bottom_{25} \cdot id)) \end{array} \right\}$$

$$\text{where } LINKcnt_2 = 6$$

Also, all the termination points ($Seg\_DOT_4$) for the segment block (2-5) shown in FIG. 5 may be calculated as follows:

$$Left_{DOT_4} = \{\emptyset\} \text{ where } Lcnt^4 = 0$$

$$Right_{DOT_4} = \{\emptyset\} \text{ where } Rcnt^4 = 0$$

$$Top_{DOT_2} = \{top_{40}, top_{41}\} \text{ where } Tcnt^4 = 2$$

$$Bottom_{DOT_2} = \{bottom_{40}\} \text{ where } Bcnt^4 = 1$$

$$In\_DOT_2 = \{in_{40}, in_{41}, in_{42}\} \text{ where } incnt^4 = 3$$

$$Seg\_DOT_4 = \{top_{40}, top_{41}, bottom_{40}, in_{40}, in_{41}, in_{42}\}$$
$$\text{where } total^4 = 6$$

For all the termination points ($Seg\_DOT_4$) of the segment block (2-5) shown in FIG. 5 which are calculated as above, two termination points ($top_{40}, in_{40}$) are connected to each other and there is a link between the points, two termination points ($top_{41}, in_{41}$) are connected to each other and there is a link between the points, and two termination points ($in_{42}, bottom_{40}$) are connected to each other and there is a link between the points. Thus, the connection characteristics among all the termination points ($LINK_4$) is calculated as follows:

$$LINK_4 = \left\{ \begin{array}{c} (top_{40} \cdot id, in_{40} \cdot id, \text{length}(top_{40} \cdot id, in_{40} \cdot id)), \\ (top_{41} \cdot id, in_{41} \cdot id, \text{length}(top_{41} \cdot id, in_{41} \cdot id)), \\ (in_{42} \cdot id, bottom_{40} \cdot id, \text{length}(in_{42} \cdot id, bottom_{40} \cdot id)) \end{array} \right\}$$

$$\text{where } LINKcnt_4 = 3$$

Therefore, all the termination points (All_Seg_DOT) and all the connection characteristics (All_LINK) are composed according to Equations 23 and 24, respectively.

$$All\_Seg\_DOT = \{Seg\_DOT_i | i=0,1,2,\ldots,(n-1)\} \quad \text{[Equation 23]}$$

$$All\_LINK = \{LINK_i | i=0,1,2,\ldots,(n-1)\} \quad \text{[Equation 24]}$$

A partial ordered set ($oset_i$) of the points at all the termination points ($Seg\_DOT_i$) in the segment block ($s_i$) is composed according to Equation 25.

$$\forall j,k,l, \quad \text{[Equation 25]}$$

if $a_j \in Seg_{DOT_i}$, $a_k \in Seg_{DOT_i}$, $a_l \in Seg_{DOT_i}$,
 ($j<l$ and $a_j$. ts$<a_l$. ts), ($l<k$ and $a_l$. ts$<a_k$. ts)
 (order($a_j$)<order($a_l$)) and (order($a_l$)<order($a_k$))
then
 ($j<k$ and $a_j$. ts$<a_k$. ts),
 (order($a_j$)<order($a_l$)),
 ($\exists a_j \in oset_i$), ($\exists a_k \in oset_i$), ($\exists a_l \in oset_i$)
where
 ($oset_i \subseteq Seg\_DOT_i$) and ($Seg\_DOT_i \subseteq oset_i$)

Here, 'order($\alpha_j$)' denotes an arrangement order of arbitrary points ($\alpha_j$) in the set. A sequence (order($\alpha_j$)<order($\alpha_k$)) between two points two points ($\alpha_j$, $a_k$) means an arrangement order that the point ($\alpha_j$) is later than the point ($a_k$).

The partial ordered set ($oset_1$) in the segment block (2-2) shown in FIG. 3 may be expressed as follows:

$$oset_i = \{left_{10}, left_{11}, left_{13}, left_{12}, ip_{10}, right_{10}, right_{12}, right_{11}\}$$

Also, the partial ordered set ($oset_2$) in the segment block (2-3) shown in FIG. 3 may be expressed as follows:

$$oset_2 = \{left_{20}, left_{22}, left_{21}, right_{20}, right_{21}, ip_{20}, right_{23}, right_{22}\}$$

Also, the partial ordered set ($oset_3$) in the segment block (2-3) shown in FIG. 4 may be expressed as follows:

$$oset_3 = \left\{ \begin{array}{c} top_{20}, bottom_{20}, top_{22}, top_{21}, top_{23}, ip_{20}, bottom_{21}, bottom_{22}, \\ top_{24}, bottom_{25}, bottom_{24}, bottom_{23} \end{array} \right\}$$

Also, the partial ordered set ($oset_4$) in the segment block (2-5) shown in FIG. 5 may be expressed as follows:

$$oset_4 = \{top_{40}, ip_{40}, top_{41}, ip_{41}, ip_{42}, bottom_{40}\}$$

Therefore, the partial ordered set (OSET) for the overall handwritten signature is composed according to Equation 26.

$$OSET = \{oset_i | i=0,1,2,\ldots,(n-1)\} \quad \text{[Equation 26]}$$

Based on the information calculated as above, the segment dynamic behavioral characteristics information ($\psi_i$) and the overall segment dynamic behavioral characteristics information ($\Psi$) are generated according to Equations 27 and 28, respectively.

$$\psi_i = \begin{Bmatrix} \{s_i,\ \#_i, \\ \text{LEFT\_DOT}_{i,}Lcnt^i,\text{Right\_DOT}_i,Rcnt^i, \\ \text{ln\_DOT}_{i,}lcnt^i,\text{Seg\_DOT}_i,total^i, \\ LINK_{i,}LINKcnt_i,oset_i\} \end{Bmatrix}$$ [Equation 27]

$$\Psi = \{\psi_i \mid i = 0, 1, 2, \ldots, (n-1)\}$$ [Equation 28]
$$= \{S, AP, \text{All\_Seg\_DOT}, \text{All\_LINK}, OSET\}$$

Also, the segment transition dynamic behavioral characteristics information ($\vec{t}_i$) for the dynamic behaviors taken during a segment transition while the handwritten signature is carried out and the overall segment transition dynamic behavioral characteristics information ($\vec{T}$) is generated according to Equations 29 and 30, respectively.

$$\vec{t}_i = (s_j, s_k, \text{outgoing}, \text{incoming})$$ [Equation 29]

where (i=0, 1, 2, ..., tmax),
(outgoing∈Seg_DOT$_j$⊆#$_j$)
(incoming∈Seg_DOT$_k$⊆#$_k$)

Here, 'tmax' denotes a maximum number of occurrences of the segment transition dynamic movement. Also, '$\vec{t}_i$' indicates that the transition occurs from an outgoing point which is one of marginal termination points in the segment ($s_j$) to an incoming point which is one of marginal termination points in the segment ($s_k$) during the transition dynamic movement. Thus, '$\vec{t}_0$' denotes the segment transition dynamic behavioral characteristics information of a first segment transition, and '$t_{tmax-1}$' denotes the segment transition dynamic behavioral characteristics information of a last segment transition.

For example, the segment transition dynamic behavioral characteristics information ('$\vec{t}_0$) of a first segment transition in the segment block (2-1) in FIG. 3 means that the segment transition occurs from a right marginal termination point (right$_{00}$) of the segment ($s_0$) which is the outgoing point to a left marginal termination point (left$_{10}$) of the segment ($s_1$) which is the incoming point, and is generated as follows:

$$\vec{t}_0 = (s_0, s_1, \text{right}_{00}, \text{left}_{10})$$

Further, the segment transition dynamic behavioral characteristics information ('$\vec{t}_1$) of a second segment transition in the segment block (2-2) in FIG. 3 means that the segment transition occurs from a left marginal termination point (left$_{11}$) of the segment ($s_1$) which is the outgoing point to a right marginal termination point (right$_{01}$) of the segment ($s_0$) which is the incoming point, and is generated as follows:

$$\vec{t}_1 = (s_1, s_0, \text{left}_{11}, \text{right}_{01})$$

If the operation continues as above, the segment transition dynamic behavioral characteristics information ('$\vec{t}_{tmax-1}$) of a last segment transition can be generated.

$$\vec{T} = \{\vec{t}_i \mid i = 0, 1, 2, \ldots, (n-1)\}$$ [Equation 30]

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments. While one or more exemplary embodiments have been described with reference to the figures, it will be understood by those of ordinary skill in the art that various changes in form and details may be made therein without departing from the spirit and scope as defined by the following claims.

DESCRIPTION OF REFERENCE NUMERALS

1: Overall Handwritten Signature Block, 2: Segment Block
100: Enrollment Unit, 200: Input Unit
300: Output Unit, 400: Handwritten Signature Input Unit
410: Scan Unit
500: Handwritten Signature Authentication Unit, 510: Control Unit
520: Handwritten Signature Characteristics Extraction Unit, 530: Handwritten Signature Tracking Unit
540: Handwritten Signature Image Acquisition Unit, 550: Handwritten Signature Characteristics Acquisition Unit
560: Handwritten Signature Segment Block Authentication Unit
610: Handwritten Signature Start Detection Unit
620: Handwritten Signature End Detection Unit
630: Spatial-Division Segment Detection Unit
640: Segment Count Unit
650: Spatial-Division Segment Block Characteristics Detection Unit
651: Sub-segment Block Generation Unit
652: Segment Block Position Detection Unit
653: Segment Block Space Characteristics Detection Unit
654: Space Ratio Characteristics Detection Unit
655: Segment Block Characteristics Information Generation Unit
660: Overall Handwritten Signature Block Characteristics Detection Unit
670: Sub-segment Block Correlation Detection Unit
671: Intersection Space Detection Unit
672: Intersection Space Ratio Detection Unit
673: Sub-segment Block Inclusion Relation Detection Unit
674: Sub-segment Block Positional Relation Detection Unit
675: Sub-segment Block Edge Positional Relation Detection Unit
677: Correlation Characteristics Information Generation Unit
680: Handwritten Signature Characteristics information Generation Unit
690: Dynamic Movement Tracking Unit

What is claimed is:

1. A system for authenticating a handwritten signature based on dynamic movement tracking of spatial-division segment, the system comprising:
a handwritten signature input unit that includes a touch input unit configured to output touch data, as handwritten signature input data, including position data and pressure data for positions that are touched by a signer for handwritten signature;
an enrollment unit configured to enroll overall handwritten signature block characteristics information of each signer; and
a handwritten signature authentication unit configured to store the handwritten signature input data including the touch data received from the handwritten signature input unit, generate a handwritten signature image by identifying the handwritten signature by use of the handwritten signature input data, generate an overall handwritten signature block including the handwritten signature, generate segment blocks by spatially dividing the generated overall handwritten signature block by a predetermined number of divisions, detect a segment image for each of the generated segment blocks, collect handwritten signature characteristics information including the overall handwritten signature block information, each segment block information, correlation information between the overall handwritten signature block and each segment block, map the collected handwritten signature characteristics information to identification information of the signer, enroll the collected handwritten signature characteristics information in the enrollment unit, collect the handwritten signature characteristics information including the overall handwritten signature block information, each segment block information, correlation information between the overall handwritten signature block and each segment block from the touch data entered through the touch input unit of the handwritten signature input unit upon receiving a request for handwritten signature authentication, load the enrolled handwritten signature characteristics information that corresponds with the identification information of the signer who requests the handwritten signature authentication, and perform the handwritten signature authentication based on segments of the handwritten signature according to a match rate by comparing the enrolled handwritten signature characteristics information with the collected handwritten signature characteristics information.

2. The system of claim 1, wherein the handwritten signature authentication unit comprises:
 a handwritten signature characteristics extraction unit configured to store the handwritten signature input data received through the touch input unit of the handwritten signature input unit, generate the handwritten signature image by identifying the handwritten signature by use of the handwritten signature input data, generate the overall handwritten signature block including the handwritten signature, generate the segment blocks by spatially dividing the generated overall handwritten signature block by the predetermined number of divisions, detect the segment image of each of the generated segment blocks, and extract the handwritten signature characteristics information including overall handwritten signature block characteristics information of the overall handwritten signature block, overall segment block characteristics information of the segment blocks constituting the handwritten signature, overall segment block position information of the segment blocks including sub-segment block position information, and overall segment block correlation characteristics information including the correlation information between the overall handwritten signature block and each segment block;
 a handwritten signature segment block authentication unit configured to perform a handwritten signature authentication according to a predetermined match rate by comparing the handwritten signature characteristics information extracted by the handwritten signature characteristics extraction unit with the pre-enrolled handwritten signature characteristics information; and
 a control unit configured to save and enroll the handwritten signature characteristics information extracted by the handwritten signature characteristics extraction unit to the enrollment unit upon receiving a request for enrollment, and perform a handwritten signature authentication by controlling the handwritten signature segment block authentication unit upon receiving the request for handwritten signature authentication.

3. The system of claim 2, wherein the handwritten signature characteristics extraction unit comprises:
 a handwritten signature start detection unit configured to detect a start of the handwritten signature from the touch data;
 a handwritten signature end detection unit configured to detect an end of the handwritten signature by designating a final touch data input point as an end point of the handwritten signature when there is no touch data input for a certain period of time after the touch data is entered;
 a spatial-division segment detection unit configured to generate the handwritten signature image by identifying the handwritten signature by use of the handwritten signature input data received through the touch input unit, generate the overall handwritten signature block including the handwritten signature, generate the segment blocks by spatially dividing the generated overall handwritten signature block by the predetermined number of divisions, and detect the segment image for each of the generated segment blocks;
 a segment count unit configured to count a number of sub-segments detected by the spatial-division segment detection unit;
 a spatial-division segment block characteristics detection unit configured to receive the segment image, determine whether the segment image is divided, generate a sub-segment block including the sub-segment when a sub-segment image re-segmented from the segment image is detected, generate segment block characteristics information and sub-segment block characteristics information for the segment block and the sub-segment block, respectively, and generate and output the overall segment block characteristics information including the segment block characteristics information and the sub-segment block characteristics information along with the overall segment block position information;
 an overall handwritten signature block characteristics detection unit configured to generate and output the overall handwritten signature block characteristics information of the overall handwritten signature block;
 a sub-segment block correlation detection unit configured to generate and output the overall segment block correlation characteristics information including correlation information between at least two of the overall handwritten signature block, the segment block, and the sub-segment blocks; and
 a handwritten signature characteristics acquisition unit including a handwritten signature characteristics information generation unit configured to generate and output the handwritten signature characteristics information including the overall handwritten signature block characteristics information, the overall segment block characteristics information, the overall segment block position information, and the overall segment block correlation characteristics information.

4. The system of claim 3, wherein the overall handwritten signature block characteristics detection unit further generates and outputs overall handwritten signature block space information by calculating space area of the overall handwritten signature block,
 wherein the spatial-division segment block characteristics detection unit comprises:
  a sub-segment block generation unit configured to receive the segment image as input, determine whether the segment image is divided, and generate the sub-segment block including the sub-segment when the sub-segment image re-segmented from the segment image is detected;

a segment block position detection unit configured to receive the segment block and the sub-segment block, and detect and output segment block position information the sub-segment block position information which represent edges of the segment block and the sub-segment blocks, respectively;

a segment block space characteristics detection unit configured to receive at least one of the segment block, the sub-segment block, the segment block position information, and the sub-segment block position information and generate and output segment block space information and sub-segment block space information by calculating space areas of the segment block and the sub-segment block;

a space ratio characteristics detection unit configured to receive the overall handwritten signature block space information, the segment block space information, and sub-segment block space information from the overall handwritten signature block characteristics detection unit, calculate a ratio of a segment block space to an overall handwritten signature block space, a ratio of a sub-segment block space to the overall handwritten signature block space, and a ratio of the sub-segment block space to the segment block space, and generate and output at least one of ratio information of the segment block space to the overall handwritten signature block space, ratio information a of the sub-segment block space to the overall handwritten signature block space, and ratio information of the sub-segment block space to the segment block space; and a segment block characteristics information generation unit configured to generate the segment block characteristics information and the sub-segment block characteristics information including corresponding information selected from: the segment block position information of each segment of the handwritten signature, the sub-segment block position information, the segment block space information, the sub-segment block space information, the ratio information of the segment block space to the overall handwritten signature block space, the ratio information of the sub-segment block space to the overall handwritten signature block space, and the ratio information of the sub-segment block space to the segment block space, and generate and output the overall segment block characteristics information for all segment blocks of the handwritten signature.

5. The system of claim 4, wherein the block is a polygon, wherein the sub-segment block generation unit generates a polygon sub-segment block surrounding the segment by passing through a top, a bottom, a leftmost, and a rightmost points of the sub-segment.

6. The system of claim 4, wherein the sub-segment block correlation detection unit comprises:

an intersection space detection unit configured to detect any adjacent sub-segment block having a relation of inclusion or intersection with the sub-segment block, and output, if any, intersection space information by calculating space of inclusion or intersection area;

an intersection space ratio detection unit configured to receive the overall handwritten signature block space information, the segment block space information, sub-segment block space information, and sub-segment block intersection space information, generate the ratio information of the sub-segment block intersection space to the overall handwritten signature block space by calculating a ratio of the sub-segment block intersection space to the overall handwritten signature block space, generate ratio information of the sub-segment block intersection space to the sub-segment block space by calculating a ratio of the sub-segment block intersection space to the sub-segment block space, and generate ratio information of the sub-segment block intersection space to an adjacent sub-segment block space by calculating a ratio of the sub-segment block intersection space to the adjacent sub-segment block space;

a segment block inclusion relation detection unit configured to generate and output sub-segment block inclusion relation information which shows whether the adjacent sub-segment block is included in or intersects the sub-segment block;

a segment positional relation detection unit configured to generate and output sub-segment block positional relation information representing relative position of the adjacent sub-segment block with respect to the sub-segment block;

an edge positional relation detection unit configured to generate and output sub-segment block edge positional relation information representing relative edge position at which edge of the sub-segment block intersects the adjacent sub-segment block; and a correlation characteristics information generation unit configured to generate and output overall segment block correlation characteristics information including the sub-segment block intersection space information, the ratio information of the sub-segment block intersection space to the overall handwritten signature block space the ratio information of the sub-segment block intersection space to the sub-segment block space, the ratio information of the sub-segment block intersection space to the adjacent sub-segment block space, the sub-segment block inclusion relation information, the sub-segment block positional relation information, and the sub-segment block edge positional relation information.

7. The system of claim 3, wherein the handwritten signature characteristics extraction unit comprises:

a dynamic movement tracking unit configured to generate overall segment dynamic behavioral characteristics information by calculating segment dynamic behavioral characteristics information representing dynamic behavioral characteristics occurred through dynamic movement of the handwritten signature based on received dynamic movement point information in the spatially-divided segment block and generate overall segment transition dynamic behavioral characteristics information by calculating segment transition dynamic behavioral characteristics information, wherein the spatial-division segment detection unit generates the dynamic movement point information, whenever the touch data is input, for a position at which the touch data occurs and outputs the dynamic movement point information to the dynamic movement tracking unit, wherein the handwritten signature characteristics acquisition unit generates and outputs the handwritten signature characteristics information further including the overall segment dynamic behavioral characteristics information and the overall segment transition dynamic behavioral characteristics information in addition to the overall handwritten signature block characteristics information, the overall segment block characteristics information, the overall segment block position information, and the overall segment block correlation characteristics information.

8. The system of claim 7, wherein the dynamic movement point information of a particular point is calculated according to a following equation 31:

Dynamic movement point information of point $\alpha_i=$
(*prev,*id,x,y,ts,sid,gid,*next*) [Equation 31]

where:
$\alpha_i$ denotes the particular point;
$\alpha_{i,prev}$ denotes a point indicating a point $\alpha_{(i-1)}$;
$\alpha_{i,id}$ denotes a point identification number corresponding to the point $\alpha_j$;
$\alpha_{i,x}$ denotes x-coordinate of the point $\alpha_i$;
$\alpha_{i,y}$ denotes y-coordinate of the point $\alpha_j$;
$\alpha_{i,ts}$ is denotes a timestamp value of the point $\alpha_j$;
$\alpha_{i,sid}$ denotes a spatial-division segment identification (ID) of the segment to which the point $\alpha_i$ belongs;
$\alpha_{i,gid}$ denotes a group ID of a group, disjointed from the segment block, to which the point $\alpha_i$ belongs; and
$\alpha_{i,next}$ denotes a point indicating a point $\alpha_{(i+1)}$.

9. The system of claim 1, wherein the segment dynamic behavioral characteristics information representing dynamic behavioral characteristics is calculated according to Equation 32, and
wherein the overall segment dynamic behavioral characteristics information is calculated according to Equation 33:

$$\psi_i = \begin{cases} s_i, \#_i, \\ \text{Left\_DOT}_i, Lcnt^i, \text{Right\_DOT}_i, Rcnt^i, \\ \text{Top\_DOT}_i, Tcnt^i, \text{Bottom\_DOT}_i, Bcnt^i, \\ \text{In\_DOT}_i, Icnt^i, \text{Seg\_DOT}_i, total^i, \\ LINK_i, LINKcnt_i, oset_i \end{cases}$$ [Equation 32]

$$\Psi = \{\psi_i \mid i = 0, 1, 2, \ldots, (n-1)\} = \{S, AP, \text{All\_Seg\_DOT}, \text{All\_LINK}, OSET\}$$ [Equation 33]

where:
$\psi_i$ denotes the segment dynamic behavioral characteristics information;
$s_i$ denotes the segment block;
$\#_i$ denotes a set of points included in the segment block;
Left_DOT$_i$ denotes a marginal termination point at a left edge of the segment block;
$Lcnt^i$ denotes a number of connections from the marginal termination point at the left edge of the segment block;
Right_DOT$_i$ denotes a marginal termination point at a right edge of the segment block;
$Rcnt^i$ denotes a number of connections from the marginal termination point at the right edge of the segment block;
Top_DOT$_i$ denotes a marginal termination point at a top edge of the segment block;
$Tcnt^i$ denotes a number of connections from the marginal termination point at the top edge of the segment block;
Bottom_DOT$_i$ denotes a marginal termination point at a bottom edge of the segment block;
$Bcnt^i$ denotes a number of connections from the marginal termination point at the bottom edge of the segment block;
In_DOT$^i$ denotes internal termination points in the segment block;
$Icnt^i$ denotes a number of connections from the internal termination points in the segment block;
Seg_DOT$_i$ denotes all the termination points in the segment block;
$total^i$ denotes a total number of all of marginal termination points and internal termination points in the segment block:
LINK$_i$ denotes a particular connection characteristic between two particular termination points in the segment block;
LINKcnt$_i$ denotes a number of connections between the two particular termination points in the segment block;
oset$_i$ denotes a partial ordered set in the segment block;
$\Psi$ denotes the overall segment dynamic behavioral characteristics information;
S denotes the overall handwritten signature block:
AP denotes a set of all the points comprising the handwritten signature;
All_Seg_DOT denotes of all the termination points;
All_LINK denotes all connection characteristics among all termination points; and
OSET denotes a partial ordered set for the overall handwritten signature.

10. The system of claim 1, wherein a segment transition dynamic behavioral characteristics information between the spatial-division segments is calculated according to Equation 34, and
wherein an overall segment transition dynamic behavioral characteristics information is composed according to Equation 35:

$$\vec{t_i} = (s_j, s_k, \text{outgoing}, \text{incoming})$$ [Equation 34]

where (i=0, 1, 2, ..., tmax),
(outgoing∈Seg_DOT$_j$⊆#$_j$)
(incoming∈Seg_DOT$_k$⊆#$_k$)

$$\vec{T} = \{\vec{t_i} \mid i=0,1,2,\ldots,(n-1)\}$$ [Equation 35]

where:
$\vec{t_i}$ denotes the segment transition dynamic behavioral characteristics information;
$s_j$ denotes an adjacent segment block;
$s_k$ denotes another adjacent segment block;
tmax denotes a maximum number of occurrences of the segment transition dynamic movement;
outgoing denotes an outgoing point which is one of marginal termination points in the adjacent segment block;
incoming denotes an incoming point which is one of marginal termination points in the another adjacent segment block;
Seg_DOT$_j$ denotes all the termination points in the adjacent segment block;
$\#_j$ denotes a set of points included in the adjacent segment block:
Seg_DOT$_k$ denotes all the termination points in the another adjacent segment block;
$\#_k$ denotes a set of points included in the another adjacent segment block; and
$\vec{T}$ denotes the overall segment transition dynamic behavioral characteristics information.

11. A method of authenticating a handwritten signature based on dynamic movement tracking of spatial-division segment, the method comprising:
- an enrollment process of storing handwritten signature input data including touch data received from a handwritten signature input unit, generating a handwritten signature image by identifying the handwritten signature by use of the handwritten signature input data, generating an overall handwritten signature block including the handwritten signature, generating segment blocks by spatially dividing the generated overall handwritten signature block by a predetermined number of divisions, detecting a segment image for each of the generated segment blocks, collecting handwritten signature characteristics information including the overall handwritten signature block information, each segment block information, correlation information between the overall handwritten signature block and each segment block, mapping the collected handwritten signature characteristics information to identification information of the signer, and enrolling the collected handwritten signature characteristics information in an enrollment unit; and
- a handwritten signature authentication process of collecting the handwritten signature characteristics information including the overall handwritten signature block information, each segment block information, correlation information between the overall handwritten signature block and each segment block from the touch data entered through a touch input unit of a handwritten signature input unit upon a request for handwritten signature authentication, loading enrolled handwritten signature characteristics information that corresponds with the identification information of the signer who requests the handwritten signature authentication, and performing the handwritten signature authentication based on segments of the handwritten signature according to a match rate by comparing the enrolled handwritten signature characteristics information with the collected handwritten signature characteristics information.

12. The method of claim 11, wherein the enrollment process comprises:
- an enrollment request monitoring operation that monitors whether a request for handwritten signature enrollment is made;
- a signer identification information acquisition operation that acquires the signer identification information to be enrolled upon request for handwritten signature enrollment;
- a handwritten signature characteristics information acquisition operation that acquires the handwritten signature characteristics information from touch data entered through the touch input unit regarding to the handwritten signature of the signer; and
- a handwritten signature enrollment operation that maps the handwritten signature characteristics information to the identification information of the signer and enrolls the handwritten signature characteristics information in the enrollment unit.

13. The method of claim 11, wherein the handwritten signature authentication process comprises:
- a handwritten signature authentication request monitoring operation that monitors whether the request for handwritten signature authentication is made;
- a signer identification information acquisition operation that acquires the signer identification information upon receiving the request for handwritten signature authentication;
- a handwritten signature characteristics information acquiring operation that acquires the handwritten signature characteristics information from the touch data received through the touch input unit for the handwritten signature of the signer;
- an enrolled handwritten signature characteristics information loading operation that loads the pre-enrolled handwritten signature characteristics information corresponding with the acquired signer identification information; and
- a handwritten signature authentication operation that performs handwritten signature authentication by comparing the acquired handwritten signature characteristics information with the enrolled handwritten signature characteristics information as loaded and outputs a result of the authentication.

14. The method of claim 12 or 13, wherein the handwritten signature characteristics information acquisition operation comprises:
- a handwritten signature tracking operation that begins tracking of the handwritten signature from the touch data of the handwritten signature input data entered through the handwritten signature input unit;
- a segment detection operation that generates the handwritten signature image by identifying the handwritten signature by use of the handwritten signature input data received through the touch input unit, generates the overall handwritten signature block including the handwritten signature, generates the segment blocks by spatially dividing the overall handwritten signature block by the predetermined number of divisions, and detects and outputs the segment image for each of the segment blocks;
- a segment count operation that counts a number of the sub-segments detected in the spatial-division segment detection operation;
- a segment block characteristics detecting operation that receives the segment image, determines whether the segment image is divided, generates a sub-segment block including the sub-segment when a sub-segment image re-segmented from the segment image is detected, generates segment block characteristics information and sub-segment block characteristics information for the segment block and the sub-segment block, respectively, and generate and output overall segment block characteristics information including the segment block characteristics information and the sub-segment block characteristics information;
- an overall handwritten signature block characteristics detection operation that generates and outputs overall handwritten signature block characteristics information of the overall handwritten signature block;
- a segment block correlation detection operation that generates and outputs the overall segment block correlation characteristics information including correlation information between at least two of the overall handwritten signature block, the segment block, and the sub-segment blocks; and
- a handwritten signature characteristics information generation operation that generates the overall segment block characteristics information including the segment block characteristics information and the sub-segment block characteristics information for all the segments and sub-segments, respectively, and generates and outputs the handwritten signature characteristics information including the overall handwritten signature block characteristics information, the overall segment block characteristics information, overall segment block position information of the generated segment blocks including sub-segment block position information, overall segment block correlation characteristics information, and overall segment dynamic behavioral characteristics information.

15. The method of claim 14, wherein the overall handwritten signature block characteristics detection operation further generates and outputs overall handwritten signature block space information by calculating space area of the overall handwritten signature block, wherein the segment block characteristics detection operation comprises:
a sub-segment block generation operation that receives the segment image as input, determines whether the segment image is divided, and generates and outputs the sub-segment block including the sub-segment when the sub-segment image re-segmented from the segment image is detected;
a segment block position detection operation that receives the segment block and the sub-segment block, and detects and outputs segment block position information the sub-segment block position information which represent edges of the segment block and the sub-segment blocks, respectively;
a segment block space characteristics detection operation that receives at least one of the segment block, the sub-segment block, the segment block position information, and the sub-segment block position information and generates and outputs segment block space information and sub-segment block space information by calculating space areas of the segment block and the sub-segment block;
a space ratio characteristics detection operation that receives the overall handwritten signature block space information, the segment block space information, and sub-segment block space information, calculates a ratio of a segment block space to an overall handwritten signature block space, a ratio of a sub-segment block space to the overall handwritten signature block space, and a ratio of the sub-segment block space to the segment block space, and generates and outputs at least one of ratio information of the segment block space to the overall handwritten signature block space, ratio information of the sub-segment block space to the overall handwritten signature block space, and ratio information of the sub-segment block space to the segment block space; and
a segment block characteristics information generation operation that generates the segment block characteristics information and the sub-segment block characteristics information including corresponding information selected from: the segment block position information of each segment of the handwritten signature, the sub-segment block position information, the segment block space information, the sub-segment block space information, the ratio information of the segment block space to the overall handwritten signature block space, the ratio information of the sub-segment block space to the overall handwritten signature block space, and the ratio information of the sub-segment block space to the segment block space, and generates and outputs the overall segment block characteristics information for all segment blocks of the handwritten signature.

16. The method of claim 15, wherein the segment block correlation detection operation comprises:
an intersection space detection operation that detects any adjacent sub-segment block having a relation of inclusion or intersection with the sub-segment block, and outputs, if any, intersection space information by calculating space of inclusion or intersection area;
an intersection space ratio detection operation that receives the overall handwritten signature block space information, the segment block space information, sub-segment block space information, and sub-segment block intersection space information, generates the ratio information of the sub-segment block intersection space to the overall handwritten signature block space by calculating a ratio of the sub-segment block intersection space to the overall handwritten signature block space, generates ratio information of the sub-segment block intersection space to the sub-segment block space by calculating a ratio of the sub-segment block intersection space to the sub-segment block space, and generates ratio information of the sub-segment block intersection space to an adjacent sub-segment block space by calculating a ratio of the sub-segment block intersection space to the adjacent sub-segment block space;
a segment block inclusion relation detection operation that generates and outputs sub-segment block inclusion relation information which shows whether the adjacent sub-segment block is included in or intersects the sub-segment block;
a segment positional relation detection operation that generates and outputs sub-segment block positional relation information representing relative position of the adjacent sub-segment block with respect to the sub-segment block;
an edge positional relation detection operation that generates and outputs sub-segment block edge positional relation information representing relative edge position at which edge of the sub-segment block intersects the adjacent sub-segment block; and
a correlation characteristics information generation operation that generates and outputs overall segment block correlation characteristics information including the sub-segment block intersection space information, the ratio information of the sub-segment block intersection space to the overall handwritten signature block space the ratio information of the sub-segment block intersection space to the sub-segment block space, the ratio information of the sub-segment block intersection space to the adjacent sub-segment block space, the sub-segment block inclusion relation information, the sub-segment block positional relation information, and the sub-segment block edge positional relation information.

17. The method of claim 14, wherein the handwritten signature characteristics information acquisition operation comprises:
a dynamic movement tracking operation that generates overall segment dynamic behavioral characteristics information by calculating segment dynamic behavioral characteristics information representing dynamic behavioral characteristics occurred through dynamic movement of the handwritten signature based on received dynamic movement point information in the spatially-divided segment block and generates overall segment transition dynamic behavioral characteristics information by calculating segment transition dynamic behavioral characteristics information, wherein, in the spatial-division segment detection operation, dynamic movement point information is generated whenever the touch data is input for a position at which the touch data occurs and is output for the dynamic movement tracking operation, wherein the handwritten signature characteristics generation operation generates and outputs the handwritten signature characteristics information further including the overall segment dynamic behavioral characteristics information and the overall segment transition dynamic behavioral characteristics information in addition to the overall handwritten signature block characteristics information, the overall segment block characteristics information, the overall segment block position information, and the overall segment block correlation characteristics information.

18. The method of claim 17, wherein the dynamic movement point information of a particular point is calculated according to a following equation 36:

$$\text{Dynamic movement point information of point } \alpha_i = (*prev, id, x, y, ts, sid, gid, *next) \qquad \text{[Equation 36]}$$

where:
$\alpha_i$ denotes the particular point;
$\alpha_{i.prev}$ denotes a point indicating a point $\alpha_{(i-1)}$;
$\alpha_{i.id}$ denotes a point identification number corresponding to the point $\alpha_i$;
$\alpha_{i.x}$ denotes x-coordinate of the point $\alpha_i$;
$\alpha_{i.y}$ denotes y-coordinate of the point $\alpha_i$;
$\alpha_{i.ts}$ denotes a timestamp value of the point $\alpha_i$;
$\alpha_{i.sid}$ denotes a spatial-division segment identification (ID) of the segment to which the point $\alpha_i$ belongs;
$\alpha_{i.gid}$ denotes a group ID of a group, disjointed from the segment block, to which the point $\alpha_i$ belongs; and
$\alpha_{i.next}$ denotes a point indicating a point $\alpha_{(i+1)}$.

19. The method of claim 16, wherein the segment dynamic behavioral characteristics information representing dynamic behavioral characteristics is calculated according to Equation 37, and wherein the overall segment dynamic behavioral characteristics information is calculated according to Equation 38:

$$\psi_i = \begin{Bmatrix} \{s_i,\ \#_i, \\ \text{Left\_DOT}_i, Lcnt^i, \text{Right\_DOT}_i, Rcnt^i, \\ \text{Top\_DOT}_i, Tcnt^i, \text{Bottom\_DOT}_i, Bcnt^i, \\ \text{In\_DOT}_i, Icnt^i, \text{Seg\_DOT}_i, total^i, \\ LINK_i, LINKcnt_i, oset_i\} \end{Bmatrix} \qquad \text{[Equation 37]}$$

$$\Psi = \{\psi_i \mid i = 0, 1, 2, \ldots, (n-1)\} = \qquad \text{[Equation 38]}$$
$$\{S, AP, \text{All\_Seg\_DOT}, \text{All\_LINK}, OSET\}$$

where:
$\psi_i$ denotes the segment dynamic behavioral characteristics information;
$s_i$ denotes the segment block;
$\#_i$ denotes a set of points included in the segment block;
Left_DOT$_i$ denotes a marginal termination point at a left edge of the segment block;
Lcnt$^i$ denotes a number of connections from the marginal termination point at the left edge of the segment block;
Right_DOT$_i$ denotes a marginal termination point at a right edge of the segment block;
Rcnt$^i$ denotes a number of connections from the marginal termination point at the right edge of the segment block;
Top_DOT$^i$ denotes a marginal termination point at a top edge of the segment block;
Tcnt$^i$ denotes a number of connections from the marginal termination point at the top edge of the segment block;
Bottom_DOT$_i$ denotes a marginal termination point at a bottom edge of the segment block;
Bcnt$^i$ denotes a number of connections from the marginal termination point at the bottom edge of the segment block;
In_DOT$_i$ denotes internal termination points in the segment block;
Icnt$^i$ denotes a number of connections from the internal termination points in the segment block;
Seg_DOT$_i$ denotes all the termination points in the segment block;
total$^i$ denotes a total number of all of marginal termination points and internal termination points in the segment block;
LINK$_i$ denotes a particular connection characteristic between two particular termination points in the segment block:
LINKcnt$_i$ denotes a number of connections between the two particular termination points in the segment block;
oset$_i$ denotes a partial ordered set in the segment block:
$\Psi$ denotes the overall segment dynamic behavioral characteristics information;
S denotes the overall handwritten signature block:
AP denotes a set of all the points comprising the handwritten signature;
All_Seg_DOT denotes of all the termination points;
All_LINK denotes all connection characteristics among all termination points; and
OSET denotes a partial ordered set for the overall handwritten signature.

20. The method of claim 16, wherein a segment transition dynamic behavioral characteristics information between the spatial-division segments is calculated according to Equation 39, and wherein an overall segment transition dynamic behavioral characteristics information is composed according to Equation 40:

$$\vec{t_1} = (s_j, s_k, \text{outgoing}, \text{incoming}) \qquad \text{[Equation 39]}$$

where (i=0, 1, 2, ..., tmax),
(outgoing $\in$ Seg_DOT$_j \subseteq \#_j$)
(incoming $\in$ Seg_DOT$_k \subseteq \#_k$)

$$\vec{T} = \{\vec{t_1} \mid i=0,1,2,\ldots,(n-1)\} \qquad \text{[Equation 40]}$$

where:
$\vec{t_1}$ denotes the segment transition dynamic behavioral characteristics information;
$s_j$ denotes an adjacent segment block:
$s_k$ denotes another adjacent segment block;
tmax denotes a maximum number of occurrences of the segment transition dynamic movement;

outgoing denotes an outgoing point which is one of marginal termination points in the adjacent segment block;

incoming denotes an incoming point which is one of marginal termination points in the another adjacent segment block;

$Seg\_DOT_j$ denotes all the termination points in the adjacent segment block:

$\#_j$ denotes a set of points included in the adjacent segment block;

$Seg\_DOT_k$ denotes all the termination points in the another adjacent segment block;

$\#_k$ denotes a set of points included in the another adjacent segment block; and $\vec{T}$ denotes the overall segment transition dynamic behavioral characteristics information.

\* \* \* \* \*